(12) United States Patent
Hong et al.

(10) Patent No.: US 11,806,842 B2
(45) Date of Patent: Nov. 7, 2023

(54) OBJECT GRASPING DEVICE AND SWAGING-TYPE TUBE FITTING FASTENING TOOL USING THE SAME

(71) Applicant: MEGAJOINT. CO., LTD., Seoul (KR)

(72) Inventors: Hyun-guk Hong, Goyang-si (KR); Woonghee Cho, Incheon (KR); Minsu Jegal, Incheon (KR)

(73) Assignee: MEGAJOINT. CO., LTD., Seoul (KR)

( * ) Notice: Subject to any disclaimer, the term of this patent is extended or adjusted under 35 U.S.C. 154(b) by 351 days.

(21) Appl. No.: 17/259,649

(22) PCT Filed: Jul. 11, 2019

(86) PCT No.: PCT/KR2019/008561
§ 371 (c)(1),
(2) Date: Jan. 12, 2021

(87) PCT Pub. No.: WO2020/013626
PCT Pub. Date: Jan. 16, 2020

(65) Prior Publication Data
US 2021/0331294 A1  Oct. 28, 2021

(30) Foreign Application Priority Data

Jul. 13, 2018 (KR) ........................ 10-2018-0081794
Jul. 10, 2019 (KR) ........................ 10-2019-0083328

(51) Int. Cl.
*B25B 11/02* (2006.01)
*B21D 39/04* (2006.01)
(Continued)

(52) U.S. Cl.
CPC ............ *B25B 11/02* (2013.01); *B21D 39/048* (2013.01); *B25B 27/026* (2013.01); *F16L 13/14* (2013.01); *F16L 2013/145* (2013.01)

(58) Field of Classification Search
CPC ........... B25B 11/00; B25B 11/02; B23Q 3/00; B23Q 3/06; B23Q 3/061; B23Q 3/067
See application file for complete search history.

(56) References Cited

U.S. PATENT DOCUMENTS 1,086,574 A  *  2/1914  Anderson ................. B25B 1/08
                                                              269/238
4,189,817 A      2/1980  Moebius
(Continued)

FOREIGN PATENT DOCUMENTS

DE         2433946         2/1976
DE         10143649        3/2003
(Continued)

OTHER PUBLICATIONS

International Search Report—PCT/KR2019/008561 dated Oct. 16, 2019.
(Continued)

*Primary Examiner* — Lee D Wilson
(74) *Attorney, Agent, or Firm* — CANTOR COLBURN LLP

(57) ABSTRACT

An object grasping device includes: an upper frame having an inner peripheral surface shape corresponding to an outer peripheral surface of an upper portion of an object to surround the outer peripheral surface; a left lower frame having an inner peripheral surface shape corresponding to an outer peripheral surface of a left lower portion of the object to surround the outer peripheral surface of the left lower portion of the object; a right lower frame having an inner peripheral surface shape corresponding to an outer peripheral surface of a right lower portion of the object to surround the outer peripheral surface of the right lower portion of the object; left and right link members linking a left portion and a right portion of the upper frame and a middle portion of the (Continued)

left lower frame by hinges and a middle portion of the right lower frame by hinges, respectively.

20 Claims, 23 Drawing Sheets

(51) Int. Cl.
*B25B 27/02* (2006.01)
*F16L 13/14* (2006.01)

(56) References Cited

U.S. PATENT DOCUMENTS

| | | | | |
|---|---|---|---|---|
| 4,625,464 | A * | 12/1986 | Kubo | B27B 33/20 |
| | | | | 30/92 |
| 8,517,365 | B2 * | 8/2013 | Velez | B25B 5/147 |
| | | | | 29/259 |
| 2013/0234429 | A1 | 9/2013 | Menno | |
| 2015/0007944 | A1 | 1/2015 | Menno | |
| 2015/0258663 | A1 | 9/2015 | Donaldson | |
| 2018/0193997 | A1 * | 7/2018 | Makkonen | B23K 37/0276 |
| 2020/0108487 | A1 * | 4/2020 | Chartier | B25B 5/106 |

FOREIGN PATENT DOCUMENTS

| | | |
|---|---|---|
| JP | 05061291 | 8/1993 |
| JP | 07035118 | 2/1995 |
| KR | 101453998 | 10/2014 |
| KR | 200478647 | 10/2015 |

OTHER PUBLICATIONS

Korean Office Action—Korean Application No. 10-2019-0083328 dated Dec. 23, 2020, citing JP 05-061291, JP 07-035118, KR 20-0478647, and U.S. Pat. No. 4,189,817.

* cited by examiner

A             B

A

B

OBJECT GRASPING DEVICE AND SWAGING-TYPE TUBE FITTING FASTENING TOOL USING THE SAME

TECHNICAL FIELD

The present application relates to an object grasping device and a swaging-type tube fitting fastening tool using the same.

BACKGROUND ART

Most tools used to fasten a swaging-type tube fitting that moves a swage ring in a longitudinal direction of a tube to a position above an outer body adopt a hydraulic driving method that may generate high force with a device having a small size and a small weight. Depending on the forms of the tools, the tools may be broadly classified into a tool (hereinafter, referred to as an 'O-shaped tool') configured to surround both the swage ring and an outer portion of the outer body, and a tool (hereinafter, referred to as a 'U-shaped tool') having a U shape, opened at one side thereof, and configured to be inserted by being pushed laterally. The tube fitting fastening tool generally includes a plurality of hydraulic cylinders, a frame configured to connect the plurality of hydraulic cylinders structurally and functionally, and an insert mounted to be replaceable in accordance with a size of the tube fitting to be fastened. Therefore, the structures and the arrangement of the hydraulic cylinders and the frame determine characteristics of the tube fitting fastening tool.

In the tube fitting fastening tool in the related art, the one or more hydraulic cylinders are used in parallel with an axis of the tube. The frame may transmit force, through the insert, to components constituting the tube fitting when the hydraulic cylinders operate to push or pull the tube fitting fastening tool so that the components constituting the tube fitting move in the longitudinal direction relative to the tube.

In the U-shaped tool in the related art, a single hydraulic cylinder may be positioned at a side opposite to an opening side, or a plurality of hydraulic cylinders may be disposed symmetrically at left and right sides of a U-shaped frame. In addition, because the U-shaped tool has a structure that may be immediately inserted into the tube fitting without an operation of opening and closing the tool through the opening side, there is an advantage in that the tool may be conveniently manipulated. In addition, the U-shaped tool is advantageous in directly machining the frame to form a passageway for hydraulic oil supplied to the hydraulic cylinder, thereby simplifying the configuration.

However, the U-shaped tool has a limitation in that the U-shaped tool may transmit force only to a partial region of the tube fitting due to the opened structure (the structure opened at one side thereof) thereof and the hydraulic cylinder cannot be disposed on the opening side. Therefore, because the hydraulic cylinder having a relatively large size is inevitably disposed at a position distant from the tube fitting, there is a drawback in that the frame needs to be relatively large and heavy in weight in order to ensure mechanical rigidity of the tool. In addition, if the tube fitting is partially separated during a fastening process, there is a risk that the fastening process may be incompletely performed or the tool may be damaged.

In addition, in the O-shaped tool in the related art, a plurality of cylinders may be disposed along a circumference that surrounds a tube. Unlike the U-shaped tool described above, the O-shaped tool operates such that one side of the O-shaped tool is opened in the form of an open mouth and then closed again after the O-shaped tool surrounds the tube fitting. Therefore, the O-shaped tool mainly uses two or more separated frames.

The O-shaped tool may transmit a balanced force along the circumference of the tube fitting, such that the O-shaped tool is structurally stable and also advantageous in miniaturization/lightweight of the frame. In addition, in comparison with the U-shaped tool, there is less likelihood that the tube fitting is separated after being fastened. However, the O-shaped tool has a limitation in that a wider space is required in a process of opening one side of the tool and placing the tube fitting in the tool in comparison with the U-shaped tool, and as a result, there is a drawback in that usability deteriorates in a narrow workspace.

The background art of the present application is disclosed in Korean Patent No. 10-1453998.

DISCLOSURE

Technical Problem

The present application has been made in an effort to solve the above-mentioned problems in the related art, and an object of the present application is to provide an object grasping device having convenience of manipulation and ease of operation in a narrow area, which are advantages of a U-shaped tool, and having safety, which is an advantage of an O-shaped tool, and to provide a swaging-type tube fitting fastening tool including the same.

However, technical problems to be solved by the exemplary embodiment of the present application are not limited to the aforementioned technical problem, and other technical problems may be present.

Technical Solution

As a technical means for achieving the above-mentioned object, an object grasping device for grasping an outer peripheral surface of an object according to the exemplary embodiment of the present application may include: an upper frame provided to have an inner peripheral surface shape corresponding to an outer peripheral surface of an upper portion of the object so as to surround the outer peripheral surface of the upper portion of the object in a grasping completion state in which the object grasping device grasps the outer peripheral surface of the object; a left lower frame provided to have an inner peripheral surface shape corresponding to an outer peripheral surface of a left lower portion of the object so as to surround the outer peripheral surface of the left lower portion of the object in the grasping completion state; a right lower frame provided to have an inner peripheral surface shape corresponding to an outer peripheral surface of a right lower portion of the object so as to surround the outer peripheral surface of the right lower portion of the object in the grasping completion state; a left link member configured to link a left portion of the upper frame and a middle portion of the left lower frame by means of hinges each having a rotating axis defined in a forward/backward direction; and a right link member configured to link a right portion of the upper frame and a middle portion of the right lower frame by means of hinges each having a rotating axis defined in the forward/backward direction.

In addition, a grasping preparation state before the object is introduced between the left link member and the right link member may be a state in which the left lower frame surrounds the outer peripheral surface of the left upper portion of the object and the right lower frame surrounds the outer peripheral surface of the right upper portion of the object, and the grasping completion state may be a state in which the left lower frame is rotated counterclockwise based on the grasping preparation state and surrounds the outer peripheral surface of the left lower portion of the object and the right lower frame is rotated clockwise based on the grasping preparation state and surrounds the outer peripheral surface of the right lower portion of the object.

In addition, the left link member and the right link member may be provided so that an interval between the left lower frame and the right lower frame defines a spacing gap through which the object passes in an intermediate grasping state in which the grasping preparation state is switched to the grasping completion state.

In addition, in the object grasping device according to the exemplary embodiment of the present application, when a pushing pressure is applied to the object grasping device in the grasping preparation state, the left lower frame and the right lower frame may rotate and reach the grasping completion state via the intermediate grasping state in which the spacing gap is formed.

In addition, the upper frame may include an upper body, and an upper insert having an inner peripheral surface shape corresponding to the outer peripheral surface of the upper portion of the object and detachably fixed to the upper body.

In addition, the left lower frame may include a left lower body, and a left lower insert having an inner peripheral surface shape corresponding to the outer peripheral surface of the left lower portion of the object and detachably fixed to the left lower body.

In addition, the right lower frame may include a right lower body, and a right lower insert having an inner peripheral surface shape corresponding to the outer peripheral surface of the right lower portion of the object and detachably fixed to the right lower body.

In addition, one or more of the upper insert, the left lower insert, and the right lower insert may have an open hole opened at one side thereof and having an inner width larger than an opening width.

In addition, a fastening member, which has a first width larger than the opening width and equal to or smaller than the inner width and has a second width which is equal to or smaller than the opening width and is a width in a direction orthogonal to a direction of the first width, is inserted into the open hole and rotated, such that one or more of the upper insert, the left lower insert, and the right lower insert are detachably fixed.

In addition, an end of the left lower insert and an end of the right lower insert, which face each other, may be provided to engage with each other in the form of an interlock structure in the grasping completion state.

In addition, the interlock structure is provided in a form that restricts individual movements in the forward/backward direction and permits a switch from the grasping preparation state to the grasping completion state.

In addition, in the grasping completion state, an end of the upper insert and the end of the left lower insert, which face each other, may be provided to engage with each other in the form of the interlock structure, and the end of the upper insert and the end of the right lower insert, which face each other, may be provided to engage with each other in the form of the interlock structure.

In addition, the object grasping device for grasping the outer peripheral surface of the object according to the exemplary embodiment of the present application may further include a link angle restriction unit provided to restrict a rotation angle of the left link member and a rotation angle of the right link member within a predetermined angle range.

In addition, the link angle restriction unit may include: a left slot member protruding and extending from the left link member toward the right link member and having a left slot; a right slot member protruding and extending from the right link member toward the left link member so as to partially intersect the left slot member and having a right slot formed to overlap the left slot in the forward/backward direction; a restriction member having a link angle restriction hole formed to overlap the portion where the left slot and the right slot overlap each other; a restriction body connected to the upper frame such that the restriction member is mounted on the restriction body so as to be movable between the left link member and the right link member in an upward/downward direction; and a restriction pin fastened to traverse an overlap region in the forward/backward direction.

In addition, a catching groove may be formed in an outer surface of the restriction member, and the link angle restriction unit may further include: a catching unit provided to be caught by the catching groove or released from the catching groove in the grasping completion state; and a locking mechanism configured to selectively provide any one of a locking holding mode that prevents the catching unit from being separated from the catching groove in the grasping completion state and a locking releasing mode that permits the separation of the catching unit from the catching groove in the grasping completion state.

In addition, the link angle restriction unit may include an elastic unit configured to elastically press the catching unit toward the catching groove so that the catching unit is caught by the catching groove.

In addition, automatic locking may be performed by the elastic unit in the grasping completion state.

In addition, one or both of an inner upper surface and an inner lower surface of the catching groove may be formed as an inclined surface so that the separation of the catching unit is guided when the restriction member moves in the upward/downward direction in the locking releasing mode.

In addition, the locking mechanism may be provided to have an available space formed outside the catching groove so as to be equal to or larger than a width of the catching unit in the locking releasing mode, and have an available space formed outside the catching groove so as to be smaller than the width of the catching unit in the locking holding mode.

In addition, the restriction body may have a receiving space in which the catching unit is disposed, and the restriction member may be disposed to be movable in the upward/downward direction through a through hole formed in the receiving space.

In addition, the locking mechanism may be placed in any one of the locking releasing mode and the locking holding mode by being moved in the upward/downward direction.

In addition, the hinge connection between the left link member and the middle portion of the left lower frame may be implemented by a snap structure including a cam part and a cam follower.

Meanwhile, a swaging-type tube fitting fastening tool according to the exemplary embodiment of the present application may include: an object grasping device configured to grasp a first object; and a fastening force providing device configured to adjust a spacing distance between the object grasping device and a neighboring object grasping device disposed adjacent to the object grasping device and configured to grasp a second object.

In addition, the swaging-type tube fitting fastening tool according to the exemplary embodiment of the present application may include the neighboring object grasping device.

The technical solution is just illustrative but should not be interpreted as being intended to limit the present application. In addition to the above-mentioned exemplary embodiment, additional exemplary embodiments may be present in the drawings and the detailed description of the invention.

Advantageous Effects

According to the above-described technical solutions of the present application, the object may be grasped or the tool may be mounted on the tube fitting by a simple operation of pushing the tool rectilinearly from one side like a U-shaped tool in the related art, thereby improving convenience of manipulation.

According to the above-described technical solutions of the present application, the object is grasped so that the entire object is surrounded like an O-shaped tool in the related art, thereby ensuring stability and providing the device having a relatively small weight and a relatively small size.

According to the above-described technical solutions of the present application, it is not necessary to perform an operation of opening a frame in order to ensure an angle for allowing insertion of an object, thereby improving usability even in a narrow space in comparison with an O-shaped tool in the related art.

However, the effects, which can be obtained by the present application, are not limited to the above-mentioned effects, and other effects may be present.

BEST MODE

Figure 1:
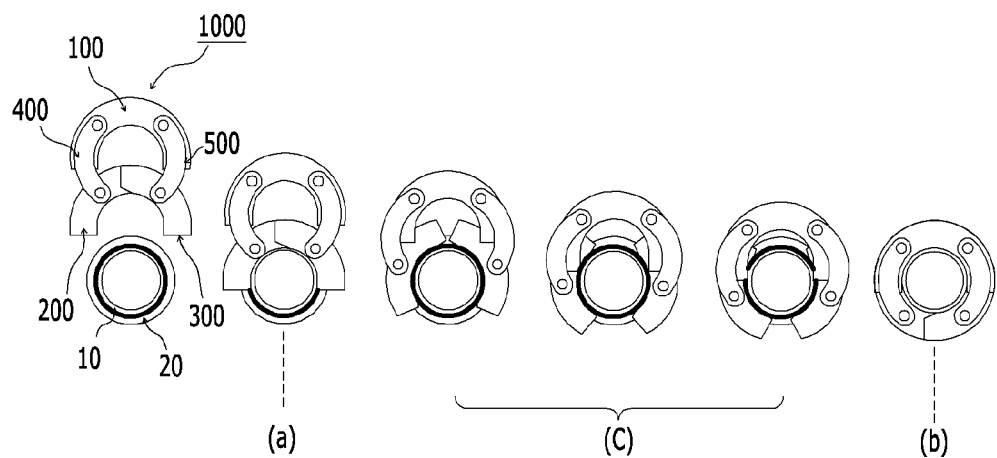
FIG. 1 is a schematic configuration view illustrating an object grasping device according to an exemplary embodiment of the present application.

Hereinafter, exemplary embodiments of the present application will be described in detail with reference to the accompanying drawings so that those with ordinary skill in the art to which the present application pertains may easily carry out the exemplary embodiments. However, the present application may be implemented in various different ways and is not limited to the exemplary embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "electrically connected to" or "indirectly connected to" the other element with other elements therebetween.

Throughout the specification, when one member is disposed "on", "at an upper side of", "at an upper end of", "below", "at a lower side of", or "at a lower end of" another member in the present specification of the present application, this includes not only a case where the one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

For reference, the terms (forward, backward, leftward, rightward, upward, and downward directions) relevant to the direction or the position described in the exemplary embodiment of the present application are set based on the arrangement state of the respective components illustrated in the drawings. For example, when viewed in FIGS. 1, 4A, and 5A to 5D, the left direction may be a 9 o'clock direction, the right direction may be a 3 o'clock direction, the upward direction may be a 12 o'clock direction, the downward direction may be a 6 o'clock direction, and the forward/backward direction may be a normal line direction based on the drawings.

However, the setting of the directions may vary depending on the arrangement state of the device according to the present application. For example, if necessary, the device according to the present application may be disposed so that an upper side thereof based on FIG. 1 is directed in a horizontal direction (leftward/rightward direction). As another example, the device according to the present application may be disposed so that the upper side thereof based on FIG. 1 is directed in an obliquely inclined direction.

An object grasping device and a swaging-type tube fitting fastening tool according to the present application may be applied in the fields that require high cleanliness as well as high leak tightness, such as fields of ultra-high purity (UHP) tubes, in industries such as semiconductor industries, biological industries, and pharmaceutical industries in which clean rooms are used with various applicability. In particular, the object grasping device and the swaging-type tube fitting fastening tool according to the present application may prevent foreign substances (contaminants), such as tube machining residues, which may remain at an end (cut surface) of an object, from being introduced into an internal space of the object. As a result, the object grasping device and the swaging-type tube fitting fastening tool may be effectively applied to a tube structure that requires a significantly high level of internal cleanliness.

However, it should not be understood that the object grasping device and the swaging-type tube fitting fastening tool according to the present application are limitedly applied to the above-mentioned industrial fields such as semiconductor industries, biological industries, and pharmaceutical industries. The object to be grasped or fastened by the object grasping device or the swaging-type tube fitting fastening tool according to the present application may be understood as a concept widely encompassing pipes, electric wires, steel reinforcing bars, and tubes. Therefore, the object grasping device and the swaging-type tube fitting fastening tool according to the present application may be widely used in various fields such as fields of construction and electricity.

Hereinafter, a process in which an object grasping device 1000 for grasping an outer peripheral surface of an object according to the exemplary embodiment of the present application grasps the outer peripheral surface of the object will be described in detail with reference to FIG. 1.

FIG. 1 is a schematic configuration view illustrating the object grasping device according to the exemplary embodiment of the present application.

Referring to FIG. 1, the object grasping device 1000 for grasping an outer peripheral surface of an object (hereinafter, referred to as the 'object grasping device 1000') according to the exemplary embodiment of the present application may include an upper frame 100, a left lower frame 200, a right lower frame 300, a left link member 400, and a right link member 500.

Throughout the specification of the present application, an object, which may be grasped by the object grasping device 1000, may be understood as a concept encompassing an object having at least a partial section having a cylindrical shape or a polygonal shape. As a specific example, the object may be a pipe, an electric wire, a steel reinforcing bar (deformed steel reinforcing bar), a tube, or the like.

In addition, objects, which may be grasped by the object grasping device 1000, may include at least one of a tube 10, which has at least a partial section having a cylindrical shape or a polygonal shape, and a tube fitting 20 provided to surround an outer peripheral surface of the tube 10. For example, the objects may include the tube 10 and the tube fitting 20 that surrounds the outer peripheral surface of the tube 10. As another example, the object may be referred to as the tube 10 itself. For example, one of the two tubes 10 may be inserted into one end of the tube fitting 20 and the other of the two tubes 10 may be inserted into the other end of the tube fitting 20 such that the two tubes 10 are connected.

The upper frame 100 is provided to have an inner peripheral surface shape corresponding to an outer peripheral surface of an upper portion of the object so as to surround the outer peripheral surface of the upper portion of the object in a grasping completion state in which the object grasping device grasps the outer peripheral surface of the object.

According to the exemplary embodiment of the present application, the upper frame of the object grasping device 1000, which is provided to grasp the object having at least a partial section having a cylindrical shape, may have the inner peripheral surface that has an upward convex arc shape (an inverted U shape) and corresponds to the outer peripheral surface of the upper portion of the cylindrical object. In this regard, the upper frame 100 may be referred to as a U-shaped frame, as another example, based on the shape of the inner peripheral surface thereof. In addition, the inner peripheral surface shape corresponding to the outer peripheral surface of the upper portion of the object may be, but not limited only to, an inner peripheral surface shape having substantially the same shape as the outer peripheral surface of the upper portion of the object. As another example, the inner peripheral surface shape corresponding to the outer peripheral surface of the upper portion of the object may be a shape including a predetermined available space with respect to the shape of the outer peripheral surface of the upper portion of the object.

The left lower frame 200 may be provided to have an inner peripheral surface shape corresponding to an outer peripheral surface of a left lower portion of the object so as to surround the outer peripheral surface of the left lower portion of the object in the grasping completion state.

According to the exemplary embodiment of the present application, the left lower frame 200 of the object grasping device 1000, which is provided to grasp the object having at least a partial section having a cylindrical shape, may have the inner peripheral surface that has a leftward convex arc shape (a C shape, i.e., a ] shape) and corresponds to the outer peripheral surface of the left lower portion of the cylindrical object. In this regard, the left lower frame 200 may be referred to as a C-shaped frame or a ] frame, as another example, based on the shape of the inner peripheral surface thereof.

The right lower frame 300 may be provided to have an inner peripheral surface shape corresponding to an outer peripheral surface of a right lower portion of the object so as to surround the outer peripheral surface of the right lower portion of the object in the grasping completion state.

According to the exemplary embodiment of the present application, the right lower frame 300 of the object grasping device 1000, which is provided to grasp the object having at least a partial section having a cylindrical shape, may have the inner peripheral surface that has a C shape (i.e., a ] shape) and corresponds to the outer peripheral surface of the right lower portion of the cylindrical object. In this regard, the right lower frame 300 may be referred to as a C-shaped frame or a ] frame, as another example, based on the shape of the inner peripheral surface thereof.

For reference, the upper portion is not limited to an upper part of the object and may vary depending on an arrangement state of the device according to the present application. For example, in a case in which the object grasping device 1000 approaches the object in an obliquely inclined direction and grasps the object, the upper portion may be determined to correspond to the obliquely inclined direction. In addition, the other terms indicating direction, such as the left lower portion and the right lower portion, may also vary depending on the arrangement state of the device according to the present application.

The left link member 400 may link a left portion of the upper frame 100 and the middle portion of the left lower frame 200 by means of hinges each having a rotating axis defined in a forward/backward direction.

The right link member 500 may link a right portion of the upper frame 100 and a middle portion of the right lower frame 300 by means of hinges each having a rotating axis defined in the forward/backward direction.

Referring to FIG. 1, an inner peripheral surface and an outer peripheral surface of each of the left link member 400 and the right link member 500 each may have, but not limited only to, an arc shape having a predetermined radius of curvature. As another example, the left link member 400 and the right link member 500 each may have a bar shape to rectilinearly connect the upper frame 100 to the left lower frame 200 or the right lower frame 300.

A grasping preparation state, before the object is introduced between the left link member 400 and the right link member 500, may be defined as a state in which the left lower frame 200 surrounds an outer peripheral surface of a left upper portion of the object and the right lower frame 300 surrounds an outer peripheral surface of a right upper portion of the object.

Referring to FIG. 1, the grasping preparation state may be represented by FIG. 1A. For assisting in understanding the present application, it can be understood that the grasping preparation state refers to a state in which the left lower frame 200 surrounds the outer peripheral surface of the left upper portion of the object and the right lower frame 300 surrounds the outer peripheral surface of the right upper portion of the object in a state in which an open side of the upper frame 100 and open sides of the left lower frame 200 and the right lower frame 300 are all disposed above the objects 10 and 20 so as to face the upper portions of the objects 10 and 20.

In addition, the grasping completion state may be defined as a state in which the left lower frame 200 rotates counterclockwise based on the grasping preparation state and surrounds the outer peripheral surface of the left lower portion of the object and the right lower frame 300 rotates clockwise based on the grasping preparation state and surrounds the outer peripheral surface of the right lower portion of the object.

Referring to FIG. 1, the grasping completion state may be represented by FIG. 1B. More specifically, for example, the grasping completion state may mean a state in which the left lower frame 200 and the right lower frame 300, which are disposed so that the open sides thereof face the upper portion of the object 10 or 20 in the grasping preparation state, are rotated counterclockwise and clockwise, respectively, the left lower frame 200 and the right lower frame 300 are coupled to each other so that the open sides of the left lower frame 200 and the right lower frame 300 are disposed below the objects 10 and 20 so as to face the lower portions of the objects 10 and 20, and the upper frame 100 approaches the objects 10 and 20 from above the objects 10 and 20 so as to surround the upper portions of the objects 10 and 20. In other words, in the grasping completion state, the upper frame 100, the left lower frame 200, and the right lower frame 300 are converted, as a whole, to be combined into a single O-shaped frame structure.

The left link member 400 and the right link member 500 may be provided so that an interval between the left lower frame 200 and the right lower frame 300 may define a spacing gap through which the object may pass in an intermediate grasping state in which the grasping preparation state is switched to the grasping completion state.

In other words, the left link member 400 and the right link member 500 may be provided so that when the left lower frame 200 rotates counterclockwise and the right lower frame 300 rotates clockwise as the grasping preparation state is switched to the grasping completion state, the interval between the left lower frame 200 and the right lower frame 300 during the rotation is set to the spacing gap through which the objects 10 and 20 may pass.

Referring to FIG. 1, the intermediate grasping state in which the grasping preparation state is switched to the grasping completion state may be represented by FIG. 1C.

In addition, when a pushing pressure is applied to the object grasping device 1000 in the grasping preparation state, the left lower frame 200 and the right lower frame 300 may rotate and reach the grasping completion state via the intermediate grasping state in which the above-mentioned spacing gap is formed.

For reference, the pushing pressure may be understood as a pressure relatively applied between the object grasping device 1000 and the objects 10 and 20. For example, the pushing pressure in the present application may be applied to the object grasping device 1000 from above to below. As another example, the pushing pressure may be a pressure applied in a direction (e.g., a direction from below to above) opposite to the direction of the pushing pressure applied to the object grasping device 1000 against the objects 10 and 20. In other words, a user of the object grasping device 1000 may initiate the rotations of the left lower frame 200 and the right lower frame 300 by applying the pushing pressure to the object grasping device 1000 or applying the pushing pressure to the objects 10 and 20.

In addition, the left link member 400 and the right link member 500 may provide restoring force to be applied in a direction of a center of the object grasping device 1000 so that the motions of the upper frame 100, the left lower frame 200, and the right lower frame 300 naturally occur during the process in which the above-described grasping preparation state is switched to the grasping completion state.

That is, the left link member 400 and the right link member 500 may provide restoring force to be applied in the direction of the center of the object grasping device 1000 so that the motion of the object grasping device 1000 grasping or releasing the object (i.e., being separated from the object) naturally occurs. Therefore, when a force for pulling the object grasping device 1000 is applied in the direction opposite to the direction of the pushing pressure so that the object grasping device 1000 is separated from the objects 10 and 20, the object grasping device 1000 may be returned, by the above-described restoring force, back to the shape corresponding to the previous grasping preparation state without a separate manipulation. For example, the restoring force may be provided by, but not limited only to, elastic members that apply elastic force or elastic restoring force, in the rotation directions, to a portion of the left link member 400, which is hingedly connected to the upper frame 100, and a portion of the right link member 500 which is hingedly connected to the upper frame 100. For example, the elastic member configured to provide elastic force or elastic restoring force in the rotation direction may be a spring.

For reference, the structure for defining the upper frame 100, the left lower frame 200, and the right lower frame 300 may be referred to as a UCC structure, as another example, based on the shapes of the upper frame 100, the left lower frame 200, and the right lower frame 300.

Hereinafter, with reference to FIGS. 2, 2B, 3A, and 3B, the shapes and the functions of the upper insert 110, the left lower insert 210, and the right lower insert 310 will be described, and a configuration in which one or more of the upper insert 110, the left lower insert 210, and the right lower insert 310 engage with each other in the form of an interlock structure in the grasping completion state will be described.

The upper frame 100 may include an upper body 101, and an upper insert 110 detachably fixed to the upper body 101 and having the inner peripheral surface shape corresponding to the outer peripheral surface of the upper portion of the object.

The left lower frame 200 may include a left lower body 201, and a left lower insert 210 detachably fixed to the left lower body 201 and having the inner peripheral surface shape corresponding to the outer peripheral surface of the left lower portion of the object.

The right lower frame 300 may include a right lower body 301, and a right lower insert 310 detachably fixed to the right lower body 301 and having the inner peripheral surface shape corresponding to the outer peripheral surface of the right lower portion of the object.

Figure 2:
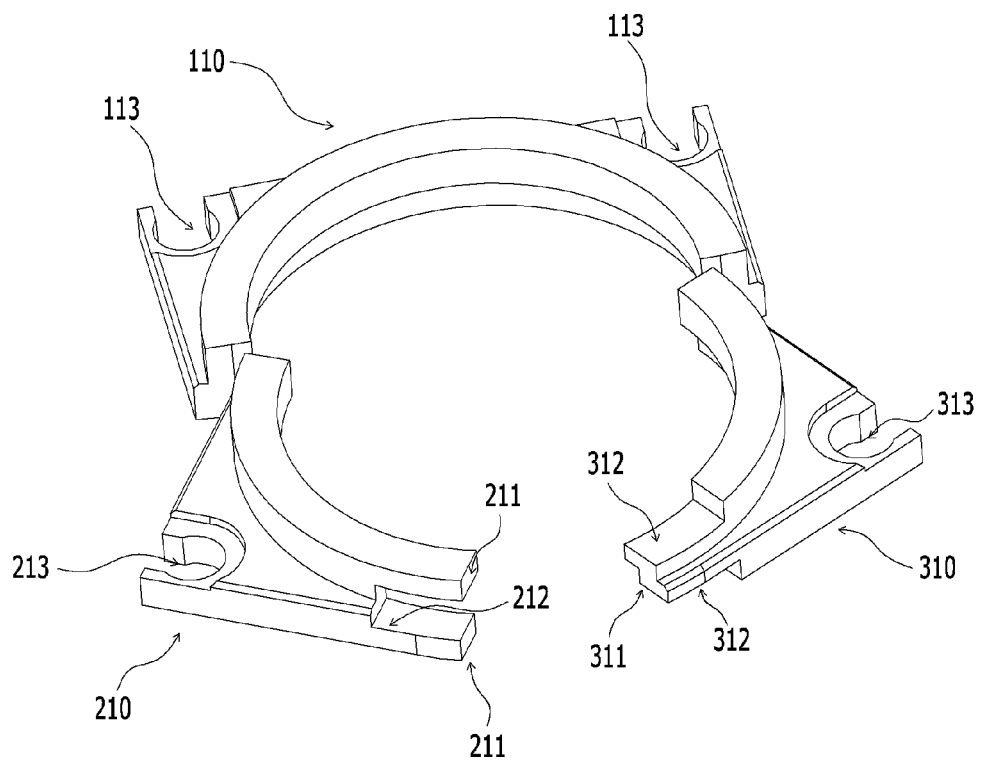
FIG. 2 is a perspective view illustrating an upper insert, a left lower insert, and a right lower insert.

FIG. 2 is a perspective view illustrating the upper insert, the left lower insert, and the right lower insert.

Referring to FIG. 2, open holes 113 may be formed in a left upper portion and a right upper portion of the upper insert 110 so that fastening members 114 are inserted into the open holes 113 so that the upper insert 110 is detachably fixed to the upper body 101. In addition, an open hole 213 may be formed in a left upper portion of the left lower insert 210 based on the grasping preparation state (i.e., a left lower portion based on the grasping completion state) so that a fastening member 114 is inserted into the open hole 213 so that the left lower insert 210 is detachably fixed to the left lower body 201. Likewise, an open hole 313 may be formed in a right upper portion of the right lower insert 310 based on the grasping preparation state (i.e., a right lower portion based on the grasping completion state) so that a fastening member 114 is inserted into the open hole 313 so that the right lower insert 310 is detachably fixed to the right lower body 301.

In this case, the position at which the open hole 113 of the upper insert 110, the open hole 213 of the left lower insert 210, or the open hole 313 of the right lower insert 310 is formed may be variously set in accordance with the exemplary embodiments.

In addition, referring to FIG. 2, protruding portions 211 and a depressed portion 212 may be alternately formed in the forward/backward direction at an end of the left lower insert 210 facing the right lower insert 310. Likewise, a protruding portion 311 and depressed portions 312 may be alternately formed in the forward/backward direction at an end of the right lower insert 310 facing the left lower insert 210. With the structure in which the protruding portions and the depressed portions are alternately formed in the forward/backward direction, the end of the left lower insert 210 and the end of the right lower insert 310, which face each other, may be provided to engage with each other in the form of the interlock structure.

Referring to FIG. 2, the left lower insert 210 may have, but not limited only to, the two protruding portions 211 and the one depressed portion 212, and the right lower insert 310 may have, but not limited only to, the one protruding portion 311 and the two depressed portions 312. As another example, each of the left lower insert 210 and the right lower insert 310 may be formed to have two or more protruding portions and two or more depressed portions.

That is, the end of the left lower insert 210 and the end of the right lower insert 310, which face each other, may be provided to engage with each other in the form of the interlock structure in the grasping completion state. In this case, the interlock structure may be understood as meaning a structure provided in a form that restricts individual movements in the forward/backward direction and permits a switch from the grasping preparation state to the grasping completion state. Referring to FIG. 2, the engagement in the form of the interlock structure may be understood as a configuration in which the protruding portion 211 of the left lower insert 210 and the depressed portion 312 of the right lower insert 310 at least partially engage with (overlap) each other in the grasping completion state and the depressed portion 212 of the left lower insert 210 and the protruding portion 311 of the right lower insert 310 at least partially engage with (overlap) each other in the grasping completion state. In this case, the interlock structure may also be understood as a structure formed by engagement between concave and convex structures.

Since the object grasping device 1000 is provided with the inserts that engage with each other in the form of the interlock structure, moment of force, which is generated when a swaging-type tube fitting fastening tool 1 according to the exemplary embodiment of the present application, which includes the object grasping device 1000, applies force for swaging, may be distributed to the inserts, such that stress is not concentrated only on the frame, unlike a tube fitting fastening tool in the related art, and as a result, it is possible to exhibit high fastening force even with the frame having relatively low rigidity. Therefore, there is an advantage of reducing an overall size and an overall weight of the swaging-type tube fitting fastening tool 1 according to the exemplary embodiment of the present application.

In addition, in the grasping completion state, the end of the upper insert 110 and the end of the left lower insert 210, which face each other, may be provided to engage with each other in the form of the interlock structure, and the end of the upper insert 110 and the end of the right lower insert 310 may be provided to engage with each other in the form of the interlock structure.

That is, the engagement in the form of the interlock structure, which has been described with reference to FIG. 2, may be applied not only between the left lower insert 210 and the right lower insert 310, but also to the end of the upper insert 110, which is in contact with the left lower insert 210 or the right lower insert 310. In this case, the effect of exhibiting the high fastening force even with the frame having relatively low rigidity by preventing stress from being concentrated only on the frame may be further increased in comparison with the case in which the interlock structure is provided only between the left lower insert 210 and the right lower insert 310.

Figure 3A:
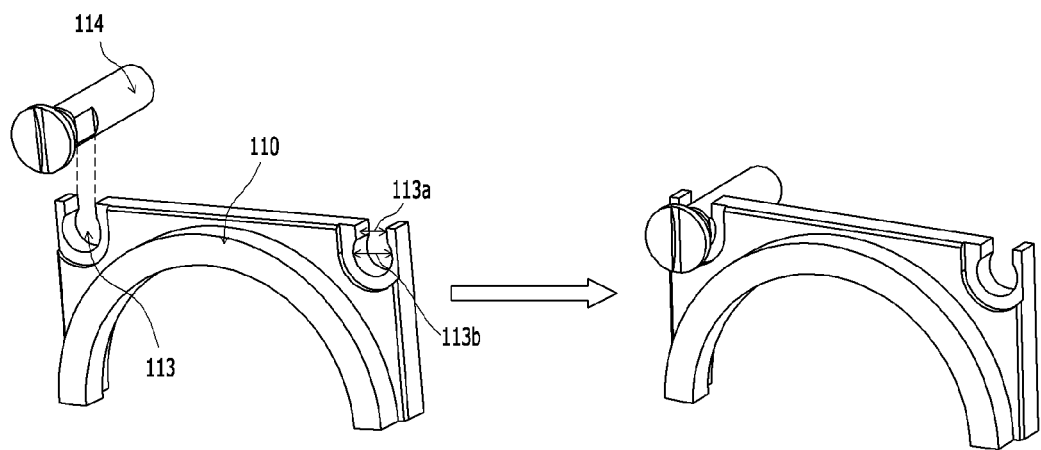
FIG. 3A is a view illustrating a state in which a fastening member is inserted into an open hole formed in the upper insert.

FIG. 3A is a view illustrating a state in which the fastening member is inserted into the open hole formed in the upper insert.

Referring to FIG. 3A, the two open holes 113, which are opened upward, may be formed in the left upper portion and the right upper portion of the upper insert 110.

Referring to FIG. 3A, the open hole 113, which is opened at one side thereof and has an inner width 113b larger than an opening width 113a, may be formed in one or more of the upper insert 110, the left lower insert 210, and the right lower insert 310. In addition, the fastening member 114, which is provided to have a first width 114a larger than the opening width 113a and equal to or smaller than the inner width 113b and have a second width 114b equal to or smaller than the opening width 113a and formed in a direction orthogonal to a direction of the first width 114a, is inserted into the open hole 113 and rotated, such that one or more of the upper insert 110, the left lower insert 210, and the right lower insert 310 may be detachably fixed to the upper body 101, the left lower body 201, and the right lower body 301.

In summary, the open hole 113 may be formed such that the inner width thereof is larger than the opening width thereof (113a<113b), and the fastening member 114 may be formed such that the first width thereof is larger than the second width thereof (114a>114b).

In a state in which the fastening member 114 is disposed such that the first width 114a extends in an upward/downward direction and the second width 114b extends in a leftward/rightward direction, the fastening member 114 may be inserted into the opening portion of the open hole 113 from above the open hole 113. After the fastening member 114 is inserted into the open hole 113 (i.e., after the fastening member 114 moves into the opening portion of the open hole 113), the fastening member 114 may be rotated (e.g., rotated by 90 degrees) to prevent the fastening member 114 from being separated from the open hole 113.

Figure 3B:
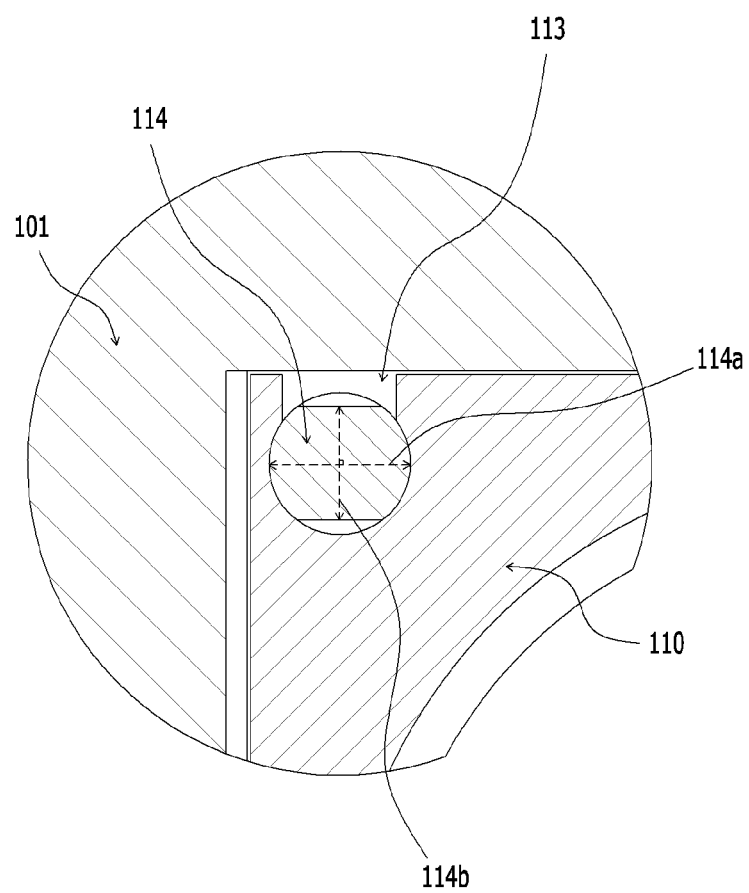
FIG. 3B is an enlarged view illustrating a state in which the fastening member inserted into the open hole is rotated after the insertion such that the upper insert is fixed.

FIG. 3B is an enlarged view illustrating a state in which the fastening member inserted into the open hole is rotated after the insertion such that the upper insert is fixed.

Referring to FIG. 3B, the fastening member 114 is inserted into the open hole 113 and then rotated (e.g., rotated by 90 degrees), such that the fastening member 114 may be disposed so that the first width 114a extends in the leftward/rightward direction and the second width 114b extends in the upward/downward direction. Since the first width 114a extending in the leftward/rightward direction is larger than the opening width 113a of the open hole after the fastening member 114 is rotated, it is possible to prevent the fastening member 114 from being separated from the open hole 113.

In addition, referring to FIG. 3A, the fastening member 114 is provided in the form of a cylindrical fastening pin extending in the forward/backward direction as a whole, and the fastening member 114 may be provided such that the portion of the fastening member 114, which is inserted into the open hole 113 having a predetermined length in the forward/backward direction, has the first width 114a and the second width 114b. For example, the other portion of the fastening member 114, except for the portion to be inserted into the open hole 113, has a cylindrical shape having a larger diameter than the inner width 113b of the open hole 113, and as a result, it is possible to prevent the fastening member 114 from moving in the forward/backward direction after the fastening member 114 is inserted into the open hole 113.

In addition, referring to FIG. 3A, a front surface of the fastening member 114 may have a groove provided to facilitate an operation of rotating the fastening member 114 to prevent the separation of the fastening member 114 after the fastening member 114 is inserted or an operation of rotating the fastening member 114 in the opposite direction to separate the previously fastened fastening member 114.

For reference, FIGS. 3A and 3B illustrate the shape of the fastening member 114 configured to be inserted and rotated to couple the upper insert 110 to the upper body 101 based on the upper insert 110 and illustrate the shape of the open hole 113, and the description of the fastening member 114 and the open hole 113 may also be equally applied to the description of the open hole 213 formed in the left lower insert 210 and the open hole 313 formed in the right lower insert 310.

In addition, according to the exemplary embodiment of the present application, an elastic member (not illustrated) may be installed on a hole inner surface, which faces the opening portion of the open hole 113, in order to provide elastic force as the elastic member is elastically restored from a compressed state toward the opening portion. In the state in which the fastening member 114 is fixed by being inserted into the open hole 113 and then rotated (e.g., rotated by 90 degrees), the elastic member (not illustrated) applies force for pushing the fastening member 114 toward the opening portion, and as a result, it is possible to prevent the fastening member 114 from being rotated in the direction in which the fastening member 114 is separated through the opening portion.

Referring to FIG. 3B, the above-mentioned elastic member may be positioned adjacent to a lower surface of the open hole 113 and interposed between a lower side of the fastening member 114 and the lower surface of the open hole 113 when the fastening member 114 is inserted into the open hole 113.

Hereinafter, a link angle restriction unit 600, which is provided to restrict a rotation angle of the left link member 400 and a rotation angle of the right link member 500 of the object grasping device 1000 within a predetermined angle range, will be described in detail with reference to FIGS. 4A and 4B.

The object grasping device 1000 according to the exemplary embodiment of the present application may include the link angle restriction unit 600 provided to restrict the rotation angle of the left link member 400 and the rotation angle of the right link member 500 within the predetermined angle range.

Even though the left link member 400 and the right link member 500 provide the restoring force in the direction of the center of the object grasping device 1000, the link member and the frame, which are positioned at a relatively lower side due to an influence of gravity, may be further tilted downward than the link member and the frame positioned at a relatively upper side when the object grasping device 1000 approaches the objects 10 and 20 in a direction, such as a right direction, a left direction, or an inclined direction of the objects 10 and 20, which is not an upward direction, and then the object grasping device 1000 grasps the objects 10 and 20.

If there is a difference in rotation angle between the left link member 400 and the right link member 500 as described above, the tube fitting 20 sometimes cannot be smoothly introduced into the upper insert 110 mounted on the upper frame 100, which may cause a deterioration in usability.

Therefore, the link angle restriction unit 600 restricts the rotation angles of the left link member 400 and the right link member 500, such that even though a force, which forces the link member positioned at the lower side to be tilted (sagged) downward, is generated, the link member positioned at the lower side cannot be opened unless the link member positioned at the upper side is lifted up, thereby preventing the above-mentioned situation.

Figure 4A:
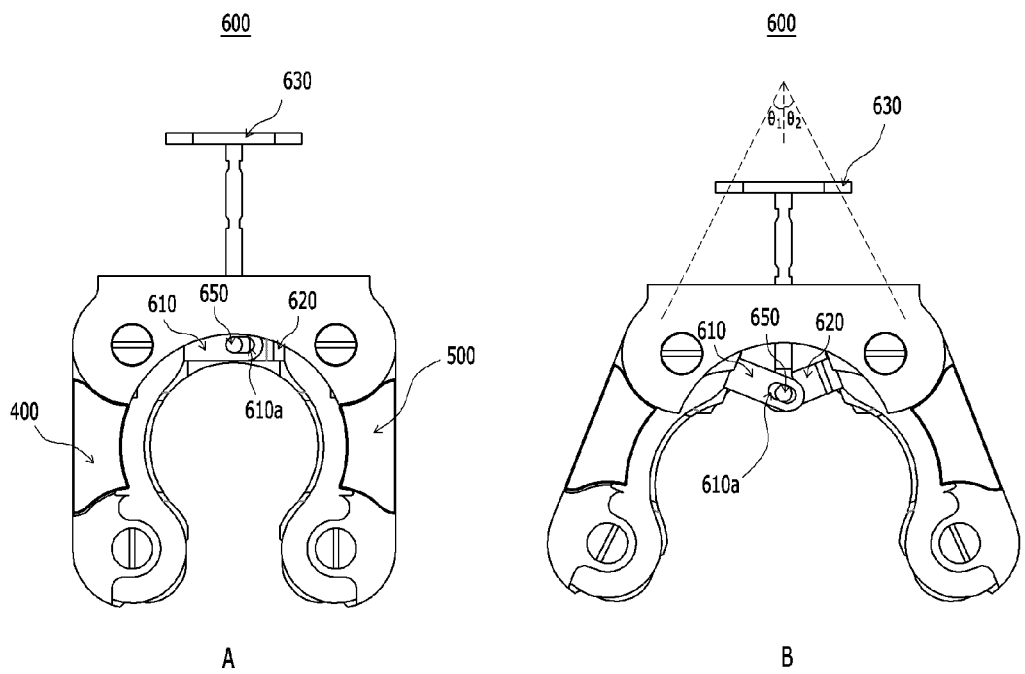
FIG. 4A is a view illustrating a link angle restriction unit of the object grasping device according to the exemplary embodiment of the present application.
Figure 4B:
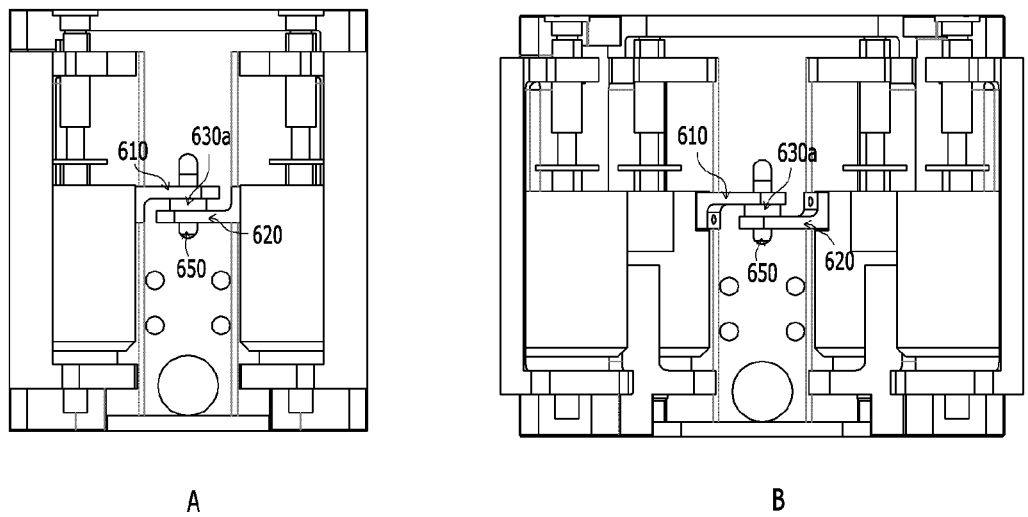
FIG. 4B is a schematic bottom plan view for explaining an interior of the link angle restriction unit.

FIG. 4A is a view illustrating the link angle restriction unit of the object grasping device according to the exemplary embodiment of the present application, and FIG. 4B is a schematic bottom plan view for explaining an interior of the link angle restriction unit.

Referring to FIG. 4A, the link angle restriction unit 600 may be provided to restrict and allow the operation of the left link member 400 and the operation of the right link member 500 to be performed symmetrically. In this case, the configuration in which the operation of the left link member 400 and the operation of the right link member 500 are performed symmetrically may be understood as a configuration in which a difference between $\theta_1$ and $\theta_2$ illustrated in FIG. 4A is equal to or less than a predetermined angle range.

For reference, A of FIG. 4A and A of FIG. 4B illustrate the link angle restriction unit 600 in a case in which the left link member 400 and the right link member 500 are not opened (i.e., in a case in which the left link member and the right link member are not rotated) in the grasping preparation state and the grasping completion state.

In addition, B of FIG. 4A and B of FIG. 4B illustrate the link angle restriction unit 600 in a case in which the left link member 400 and the right link member 500 are opened at a predetermined angle or more (i.e., in a case in which the left link member and the right link member are rotated at a predetermined level) in the intermediate grasping state.

Referring to FIGS. 4A and 4B, the link angle restriction unit 600 may include a left slot member 610, a right slot member 620, a restriction member 630, a restriction body 640, and a restriction pin 650.

The left slot member 610 protrudes and extends from the left link member 400 toward the right link member 500 and may have a left slot 610a. In this case, the left slot 610a may be formed in the form of a long hole formed in the leftward/rightward direction or a longitudinal direction in which the left slot member 610 extends.

The right slot member 620 protrudes and extends from the right link member 500 toward the left link member 400 so as to partially intersect the left slot member 610 and may have a right slot 620a that overlaps the left slot 610a in the forward/backward direction. In this case, the right slot 620a may be formed in the form of a long hole formed in the leftward/rightward direction or a longitudinal direction in which the right slot member 620 extends.

The restriction member 630 may have a link angle restriction hole 630a formed to overlap the portion where the left slot 610a and the right slot 620a overlap each other. For example, the link angle restriction hole 630a may have, but not limited only to, a circular or elliptical shape opened in the forward/backward direction.

According to the exemplary embodiment of the present application, the restriction member 630 may be formed in the form of a shaft extending in the upward/downward direction. In addition, the restriction member 630 may be referred to as a lock shaft, as another example.

The restriction body 640 is connected to the upper frame 100, and the restriction member 630 may be mounted on the restriction body 640 so as to be movable between the left link member 400 and the right link member 500 in the upward/downward direction. Specifically, the restriction body 640 may have a receiving space 640a in which a catching unit 632 is disposed. The restriction member 630 may be disposed to be movable in the upward/downward direction through a through hole formed in the receiving space 640a. In addition, the receiving space 640a may be at least partially opened or closed by a locking mechanism 660 to be described below, such that an exposed volume of the receiving space 640a may be changed.

In this case, for example, a position at which the restriction member 630 is mounted between the left link member 400 and the right link member 500 so as to be movable in the upward/downward direction may be a center position between the left link member 400 and the right link member 500. In addition, the left slot 610a and the right slot 620a may be vertically symmetrically formed based on the center position. Therefore, the left link member 400 and the right link member 500 may perform the vertically symmetrical operations.

In addition, a length and a position of the left slot 610a and a length and a position of the right slot 620a may be set to form a spacing gap through which the objects 10 and 20 may pass when the left link member 400 and the right link member 500 are in the intermediate grasping state.

The restriction pin 650 may be fastened to traverse, in the forward/backward direction, the overlap region in which all the left slot 610a, the right slot 620a, and the link angle restriction hole 630a overlap one another.

Hereinafter, a locking holding mode in which the object grasping device 1000 continues to grasp the object in the grasping completion state and a locking releasing mode in which the grasping completion state is switched to the grasping preparation state will be described in detail with reference to FIGS. 5A to 5D.

Figure 5A:
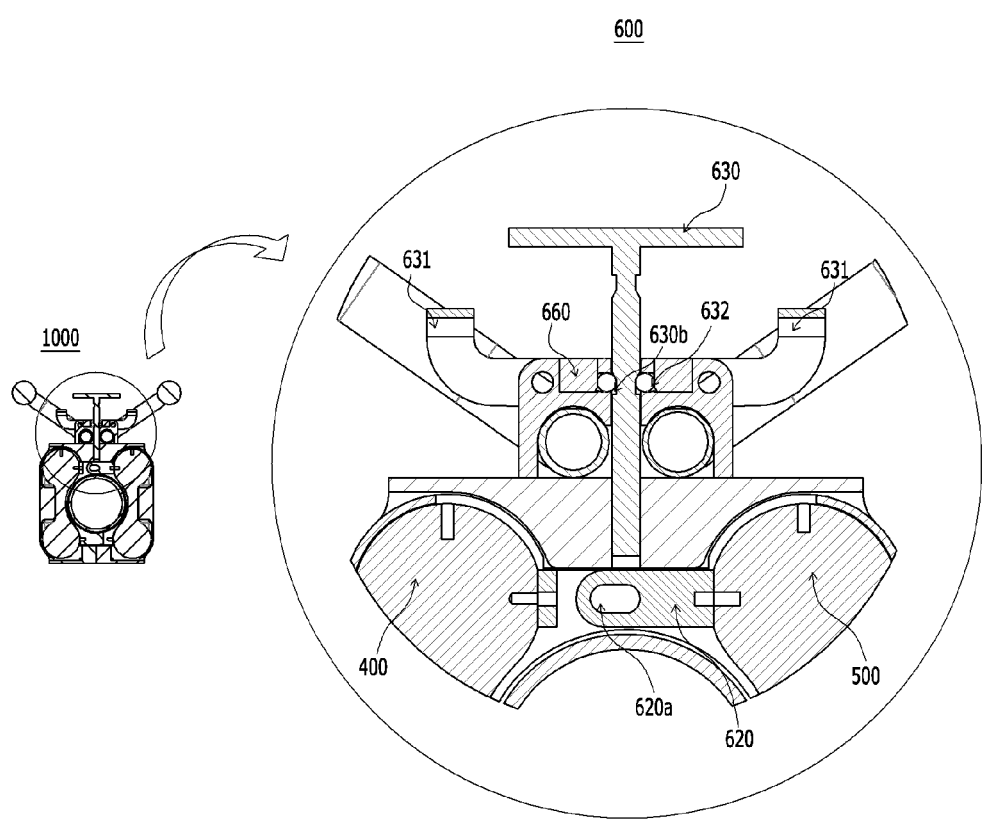
FIG. 5A is a front view for explaining a locking holding mode in which a catching unit is caught by and fastened to a catching groove.
Figure 5B:
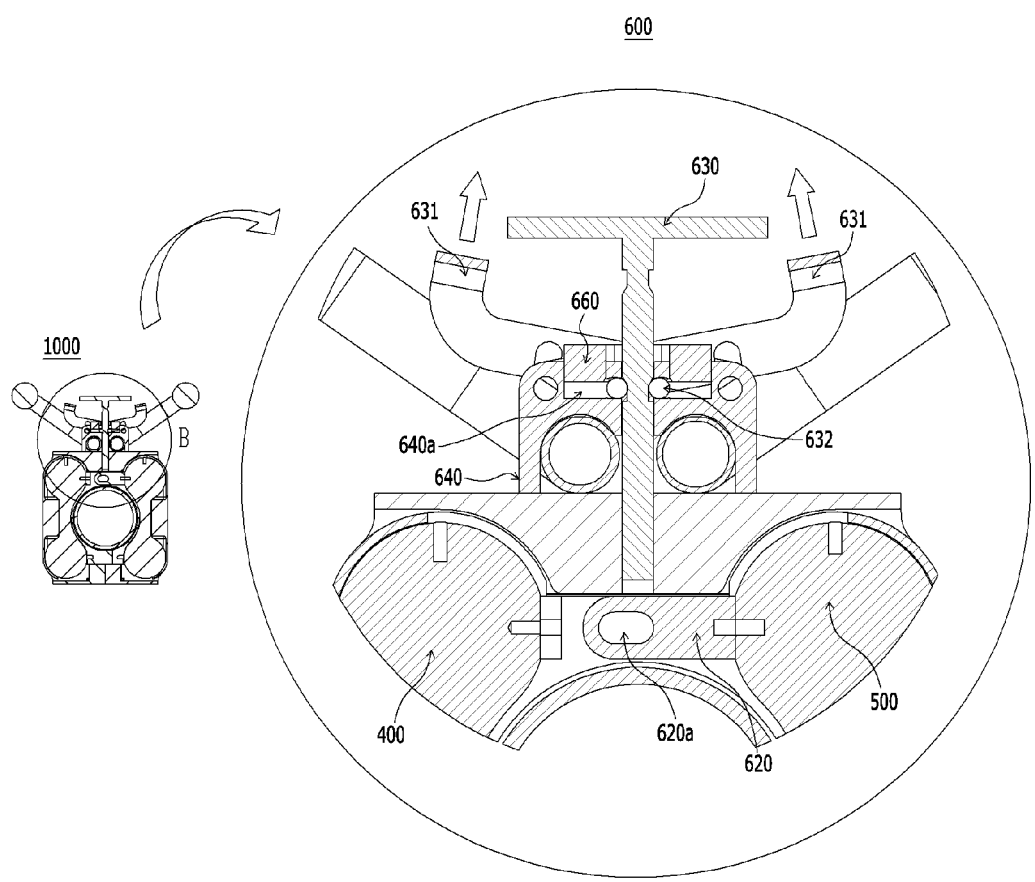
FIG. 5B is a front view for explaining a state in which the locking holding mode is switched to a locking releasing mode in order to allow the catching unit to be separated from the catching groove.
Figure 5C:
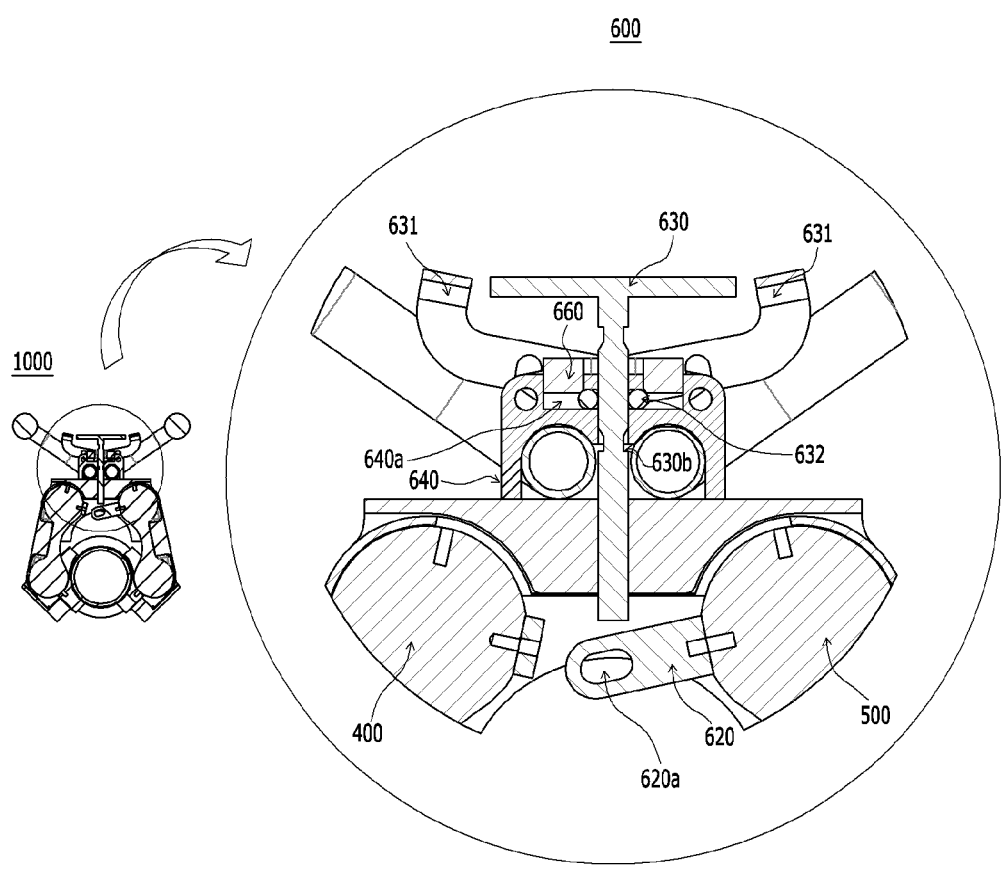
FIG. 5C is a front view for explaining a state in which the object grasping device according to the exemplary embodiment of the present application is switched to an intermediate grasping state after the catching unit is separated from the catching groove.

FIG. 5A is a front view for explaining the locking holding mode in which the catching unit is caught by and fastened to a catching groove, FIG. 5B is a front view for explaining a state in which the locking holding mode is switched to the locking releasing mode so as to allow the catching unit to be separated from the catching groove, and FIG. 5C is a front view for explaining a state in which the object grasping device according to the exemplary embodiment of the present application is switched to the intermediate grasping state after the catching unit is separated from the catching groove.

Referring to FIGS. 5A to 5C, a catching groove 630*b* may be formed in an outer surface of the restriction member 630. In this regard, the link angle restriction unit 600 may include the catching unit 632 and the locking mechanism 660.

In addition, referring to FIGS. 5A to 5C, a pair of catching grooves 630*b* may be formed to face each other at a height corresponding to each other at left and right sides of the outer surface of the restriction member 630. In addition, a plurality of pairs of catching grooves 630*b* may be provided in the restriction member 630 in the upward/downward direction. In this case, in the case in which the pair of catching grooves 630*b* is formed in the outer surface of the restriction member 630, a pair of catching units 632 may be provided to be caught by the catching grooves 630*b* or released from the catching grooves 630*b*. However, the present application is not limited only thereto, and the positions and the number of the catching grooves 630*b* may be variously set in accordance with the exemplary embodiments.

The catching unit 632 may be provided to be caught by the catching groove 630*b* or released from the catching groove 630*b* in the grasping completion state. For example, the catching unit 632 may be a member in the form of a pin having a circular, elliptical, or polygonal cross section, having a cylindrical shape or an elliptical column shape, and extending in the forward/backward direction, a member having a spherical shape, or a bearing, and the like.

In the swaging-type tube fitting fastening tool 1 according to the exemplary embodiment of the present application which includes the object grasping device 1000, the object grasping device 1000 and a neighboring object grasping device may be moved by a fastening force provided from a hydraulic cylinder or the like so as to be close to each other in the forward/backward direction. Therefore, in the case of the catching unit 632 provided as the pin-shaped member, the restriction member 630 may be moved by the catching groove 630*b* along the pin-shaped catching unit 632 in the forward/backward direction even though a spacing distance in the forward/backward direction between the object grasping device 1000 and the neighboring object grasping device is increased or decreased. As a result, the locking state of the object grasping device 1000 or the neighboring object grasping device may be maintained. For example, even though the object grasping device 1000 moves to be close to the neighboring object grasping device in the forward/backward direction in a state corresponding to the locking holding mode, the restriction member 630 moves along the pin-shaped catching unit 632 in the forward/backward direction, such that the locking holding mode may be maintained. In this case, an extension length of the pin shape may be set in consideration of the spacing distance in the forward/backward direction between the object grasping device 1000 and the neighboring object grasping device.

The locking mechanism 660 may be provided to selectively provide any one of the locking holding mode that prevents the catching unit 632 from being separated from the catching groove 630*b* in the grasping completion state and the locking releasing mode that permits the separation of the catching unit 632 from the catching groove 630*b* in the grasping completion state.

For example, the locking mechanism 660 may be provided in the form of a block having a hole formed in the upward/downward direction so that the locking member 630 may move in the upward/downward direction. In addition, in the swaging-type tube fitting fastening tool 1 according to the exemplary embodiment of the present application including the object grasping device 1000, the hole formed in the locking mechanism 660 may be provided in the form of a long hole (slot) extending in the forward/backward direction so that when the object grasping device 1000 and the neighboring object grasping device relatively move in the forward/backward direction, the restriction member 630 may move in the forward/backward direction in conjunction with the movements of the object grasping device 1000 and the neighboring object grasping device.

The locking mechanism 660 may be provided to have an available space formed outside the catching groove 630*b* so as to be equal to or larger than a width of the catching unit 632 in the locking releasing mode, and have an available space formed outside the catching groove 630*b* so as to be smaller than the width of the catching unit 632 in the locking holding mode. In addition, the locking mechanism 660 may be placed in any one of the locking releasing mode and the locking holding mode by being moved in the upward/downward direction.

For example, when the locking mechanism 660 moves upward (see FIG. 5B), the available space equal to or larger than the width of the catching unit 632 may be formed in the receiving space 640*a* so that at least a part of the receiving space 640*a* formed in the restriction body 640 outside the catching unit 632 is exposed and the catching unit 632 may be separated from the catching groove 630*b*. For example, the state in which the available space equal to or larger than the width of the catching unit 632 is formed in the receiving space 640*a* so that the catching unit 632 may be separated from the catching groove 630*b* may be understood as corresponding to the locking releasing mode.

On the contrary, when the locking mechanism 660 moves downward, at least a part of the receiving space 640*a* formed in the restriction body 640 is closed by the locking mechanism 660 moved downward, such that the available space smaller than the width of the catching unit 632 may be formed in the receiving space 640*a* so that the catching unit 632 is not separated from the catching groove 630*b*. For example, the state in which the available space smaller than the width of the catching unit 632 is formed in the receiving space 640*a* so that the catching unit 632 is not separated from the catching groove 630*b* may be understood as corresponding to the locking holding mode.

In this regard, according to the exemplary embodiment of the present application, the link angle restriction unit 600 may include a locking lever 631 configured to be manipulated to move the locking mechanism 660 in the upward/downward direction. For example, when the locking lever 631 is pulled upward in the locking holding mode, the locking mechanism 660 moves upward to switch to the locking releasing mode. The shape of the locking lever 631 or the method of manipulating the locking lever 631 may be variously set in accordance with the exemplary embodiments.

In addition, the link angle restriction unit 600 may include an elastic unit (not illustrated) configured to elastically press the catching unit 632 toward the catching groove 630*b* so that the catching unit 632 is caught by the catching groove 630b. The automatic locking may be performed by the elastic unit in the grasping completion state. For example, the elastic unit may be a spring.

The elastic unit provides elastic force as the elastic unit is elastically restored from the compressed state toward the locking member 630, and thus the elastic unit applies force for pushing the catching unit 632 toward the locking member 630 (to bring the catching unit 632 into close contact with the locking member 630), the catching unit 632 may be caught by the catching groove 630b by the elastic unit without a separate manipulation when the outer surface of the catching unit 632 is introduced into at least a part of the catching groove 630b as the locking member 630 moves upward or downward.

Therefore, the catching unit 632 is automatically caught by the catching groove 630b by the elastic unit in the grasping completion state of the object grasping device 1000, such that the automatic locking may be performed to maintain the grasping completion state unless a separate external force is applied.

In addition, one or both of an inner upper surface and an inner lower surface of the catching groove 630b may be formed as an inclined surface so that the separation of the catching unit 632 is guided when the restriction member 630 moves in the upward/downward direction in the locking releasing mode.

Referring to FIGS. 5A to 5C, in a case in which the left link member 400 and the right link member 500 are placed in the intermediate grasping state while rotating (i.e., while the interval between the left lower frame 200 and the right lower frame 300 is increased to define a spacing gap through which the objects 10 and 20 may pass) after the locking holding mode is switched to the locking releasing mode, the locking member 630 moves downward together with the restriction pin 650 that moves downward in the overlap region in which all the left slot 610a, the right slot 620a, and the link angle restriction hole 630a overlap one another.

Therefore, referring to FIGS. 5A to 5C, the inner upper surface of the catching groove 630b may be formed as an inclined surface so that the catching unit 632 is smoothly separated from the catching groove 630b when the locking member 630 moves downward in the locking releasing mode, but the present application is not limited only thereto. As another example, one or both of the inner upper surface and the inner lower surface of the catching groove 630b may be formed as the inclined surface.

Figure 5D:
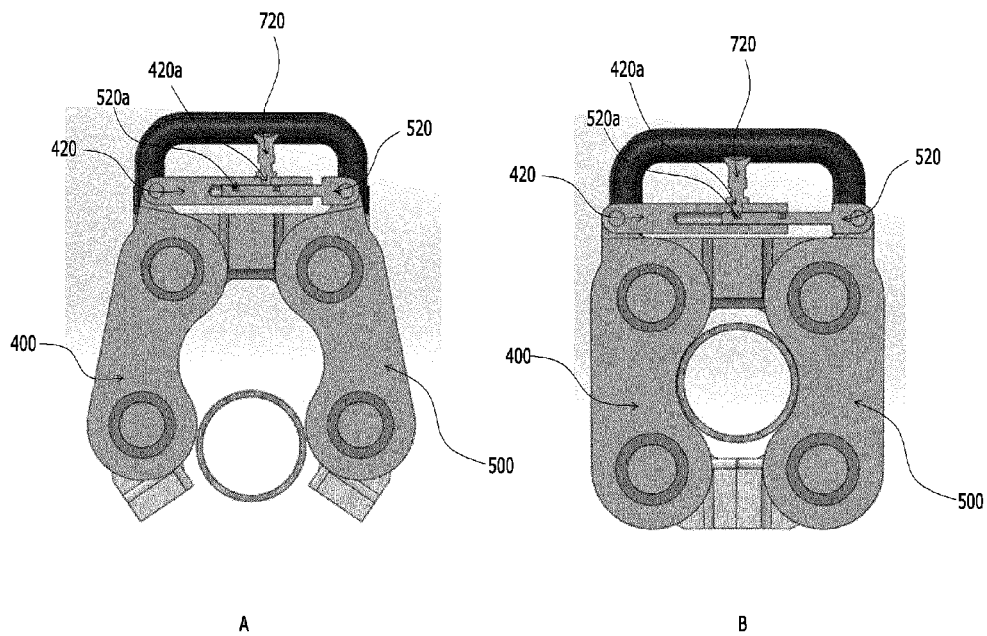
FIG. 5D is a front view for explaining a locking holding mode and a locking releasing mode of an object grasping device according to another exemplary embodiment of the present application.

FIG. 5D is a front view for explaining a locking holding mode and a locking releasing mode of an object grasping device according to another exemplary embodiment of the present application. A of FIG. 5D illustrates the link angle restriction unit 600 in the locking releasing mode, and B of FIG. 5D illustrates the link angle restriction unit 600 in the locking holding mode.

Referring to FIG. 5D, the link angle restriction unit 600 of the object grasping device according to another exemplary embodiment of the present application may include a guide groove member 420, a guide protrusion 520, and a second locking member 720.

The guide groove member 420 may protrude and extend from the left link member 400 toward the right link member 500, and the guide protrusion 520 may protrude and extend from the right link member 500 toward the left link member 400.

In addition, the guide groove member 420 and the guide protrusion 520 may slide relative to each other such that the guide protrusion 520 is at least partially inserted into the guide groove member 420 so as to correspond to the rotation angle of the left link member 400 and the rotation angle of the right link member 500.

The second catching unit 720 may be provided to be caught by the second catching groove 520a or released from the second catching groove 520a in the grasping completion state.

In addition, the guide groove member 420 may have a second through hole 420a through which the second catching unit 720 passes. The second catching unit 720 may be disposed to be movable in the upward/downward direction through the second through hole 420a.

In addition, the guide protrusion 520 may have the second catching groove 520a into which a lower portion of the second catching unit 720 is at least partially inserted.

Referring to A of FIG. 5D, the second locking member 720 is separated from the second catching groove 520a in the locking releasing mode, such that the guide protrusion 520 and the guide groove member 420 may slide relative to each other in the locking releasing mode.

On the contrary, referring to B of FIG. 5D, at least a part of a lower end of the second locking member 720 is inserted into the second catching groove 520a in the locking holding mode, such that the relative sliding movements of the guide protrusion 520 and the guide groove member 420 may be prevented in the locking holding mode.

Therefore, in the locking releasing mode, the left link member 400 may rotate, the right link member 500 may rotate, and the left link member 400 and the right link member 500 may rotate to define the spacing gap through which the objects 10 and 20 may pass, such that the object grasping device 1000 may grasp or release the objects 10 and 20.

On the contrary, since the relative sliding movements of the guide protrusion 520 and the guide groove member 420 are prevented in the locking holding mode, the left link member 400 cannot rotate, the right link member 500 cannot rotate, and the left link member 400 and the right link member 500 cannot rotate to define the spacing gap through which the objects 10 and 20 may pass, such that the grasping preparation state or the grasping completion state of the object grasping device 1000 may be maintained.

For example, in the case of the locking holding mode in the grasping completion state, it is possible to prevent the grasped object from being separated from the object grasping device 1000.

In addition, according to the exemplary embodiment of the present application, as the second catching unit 720, which has an upper end protruding upward and a lower end at least partially caught by and fastened to the second catching groove 520a, is pulled upward in the locking holding mode, the lower end of the second catching unit 720 is separated from the second catching groove 520a, such that the locking holding mode may be switched to the locking releasing mode. That is, the grasping completion state of the object grasping device 1000 may be securely maintained by the locking holding mode implemented by the comparatively simple structure, and the locking holding mode may be switched to the locking releasing mode even with the simple manipulation.

Hereinafter, a configuration in which the left link member 400 and the middle portion of the left lower frame 200 are hingedly connected by a snap structure will be described in detail with reference to FIGS. 6A to 6C.

Figure 6A:
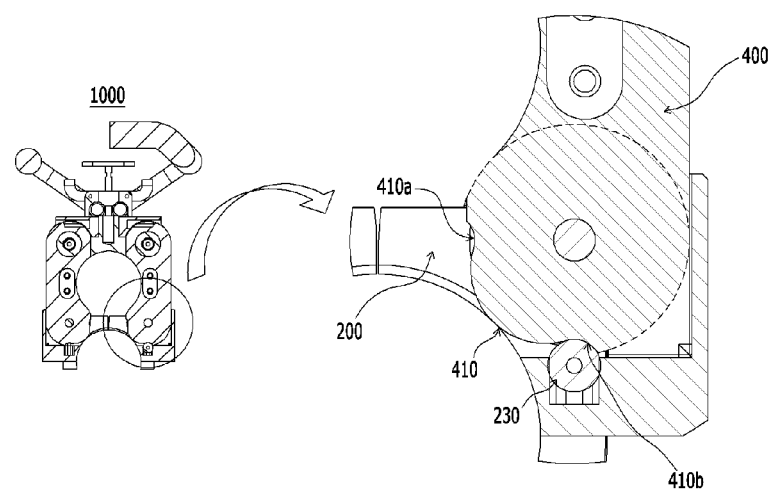
FIG. 6A is a rear view for explaining a state in which a left link member and a middle portion of a left lower frame are hingedly connected by means of a snap structure in a grasping preparation state.
Figure 6B:
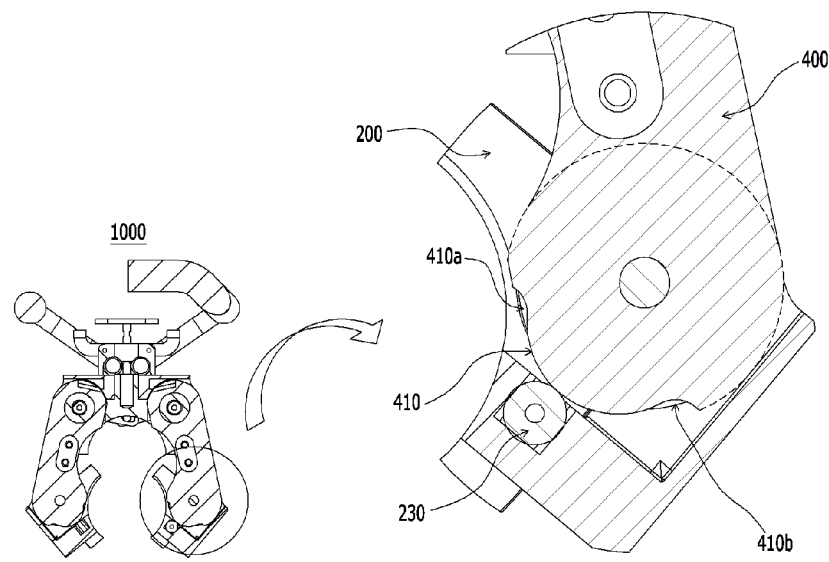
FIG. 6B is a rear view for explaining a state in which the left link member and the middle portion of the left lower frame are hingedly connected by means of the snap structure in the intermediate grasping state.
Figure 6C:
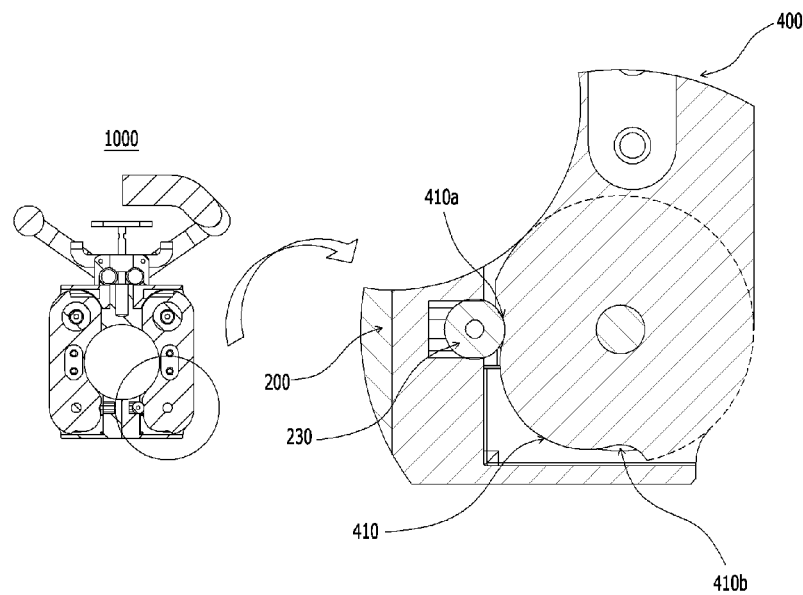
FIG. 6C is a rear view for explaining a state in which the left link member and the middle portion of the left lower frame are hingedly connected by means of the snap structure in a grasping completion state.

FIG. 6A is a rear view for explaining a state in which the left link member and the middle portion of the left lower frame are hingedly connected by the snap structure in the grasping preparation state, FIG. 6B is a rear view for explaining a state in which the left link member and the middle portion of the left lower frame are hingedly connected by the snap structure in the intermediate grasping state, and FIG. 6C is a rear view for explaining a state in which the left link member and the middle portion of the left lower frame are hingedly connected by the snap structure in the grasping completion state.

Referring to FIGS. 6A to 6C, the hinge connection between the left link member 400 and the middle portion of the left lower frame 200 may be implemented by the snap structure including a cam part and a cam follower 230.

Specifically, the snap structure may be understood as a structure in which an outer surface of the cam part at the lower portion of the left link member 400 is formed with a first groove 410a, a second groove 410b, and a protruding peripheral surface 410 for connecting the first groove 410a and the second groove 410b, and the cam follower 230 provided on the left lower frame 200 hingedly rotates (the rotation implemented as the left lower frame 200 and the left link member 400 are hingedly coupled) to be positioned in the first groove 410a (in the grasping completion state), positioned in the second groove 410b (in the grasping preparation state), or moved between the first groove 410a and the second groove 410b (in the intermediate grasping state) so as to switch to the grasping preparation state, the intermediate grasping state, or the grasping completion state.

In this case, a partial section of an outer surface of the cam part at the lower portion of the left link member 400 is formed to include a surface having an arc shape (see the dotted line in FIGS. 6A to 6C), and the other section of the cam part is formed to include a curved surface having the two depressed surfaces 410a and 410b and the protruding peripheral surface 410 for connecting the two depressed surfaces 410a and 410b. The first groove 410a may be formed at a position corresponding to the grasping completion state, and the second groove 410b is formed at a position corresponding to the grasping preparation state. For example, the first groove 410a and the second groove 410b may be formed at the positions at which a central angle of the arc of the surface having the arc shape is 90 degrees.

Referring to FIG. 6A, the cam follower 230 may be caught by the second groove 410b in the grasping preparation state. In this state, because a predetermined force or higher is required to separate the cam follower 230 from the second groove 410b, it is possible to prevent the left lower frame 200 from arbitrarily rotating in the grasping preparation state.

Referring to FIG. 6B, in the intermediate grasping state, the cam follower 230 may move along the protruding peripheral surface 410 between the first groove 410a and the second groove 410b of the left link member 400.

Referring to FIG. 6C, the cam follower 230 may be caught by the first groove 410a in the grasping completion state. In this state, because a predetermined force or higher is required to separate the cam follower 230 from the first groove 410a, it is possible to prevent the left lower frame 200 from arbitrarily rotating in the grasping completion state.

That is, since the object grasping device 1000 has the snap structure for hingedly connecting the link member and the frame by means of the cam part and the cam follower 230, it is possible to prevent the left lower frame 200 from arbitrarily rotating in the grasping completion state or the grasping preparation state. In addition, since the grasping completion state and the grasping preparation state may be divided by the separate operations, there is an effect of performing the operation of grasping the object or releasing the object in a moderate manner.

According to the exemplary embodiment, the hinge connection implemented by the snap structure including the cam part and the cam follower 230 may be provided between the right link member 500 and the middle portion of the right lower frame 300 or provided both between the left link member 400 and the middle portion of the left lower frame 200 and between the right link member 500 and the middle portion of the right lower frame 300.

Hereinafter, the swaging-type tube fitting fastening tool 1 according to the exemplary embodiment of the present application including the object grasping device 1000 and a fastening force providing device 40 will be described in detail with reference to FIGS. 7A to 8C.

Figure 7A:
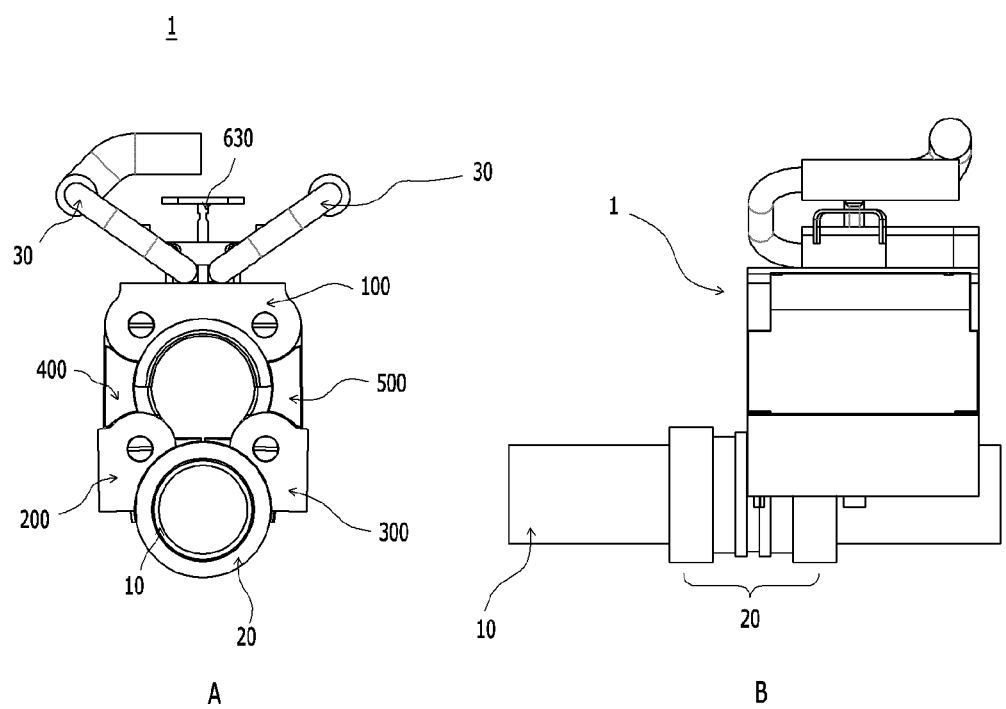
FIG. 7A is a schematic front view and a right side view illustrating a swaging-type tube fitting fastening tool according to the exemplary embodiment of the present application in the grasping preparation state.
Figure 7B:
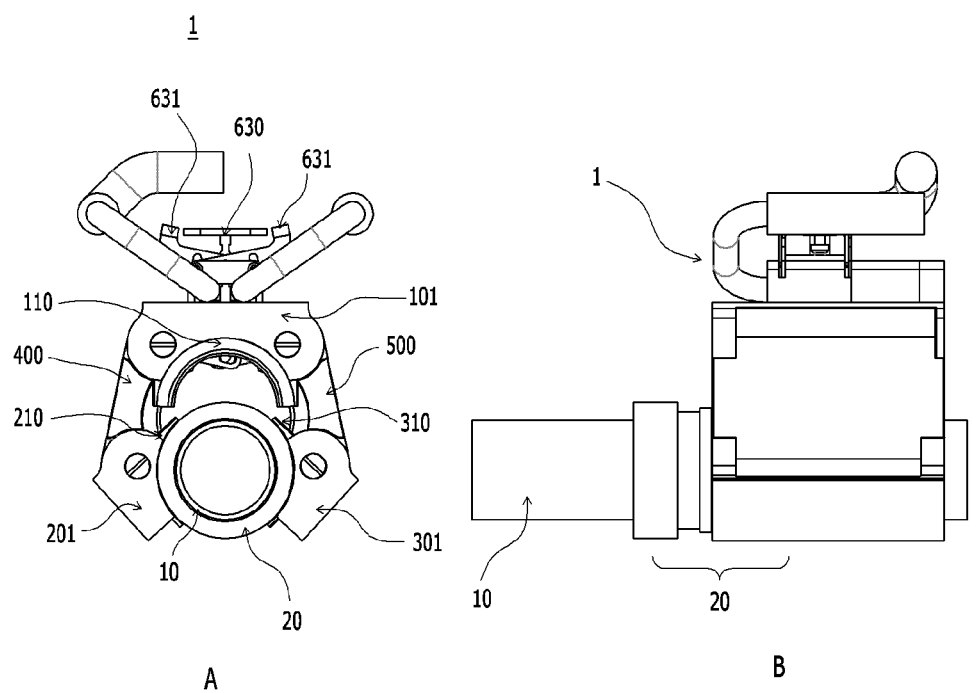
FIG. 7B is a schematic front view and a right side view illustrating the swaging-type tube fitting fastening tool according to the exemplary embodiment of the present application in the intermediate grasping state.
Figure 7C:
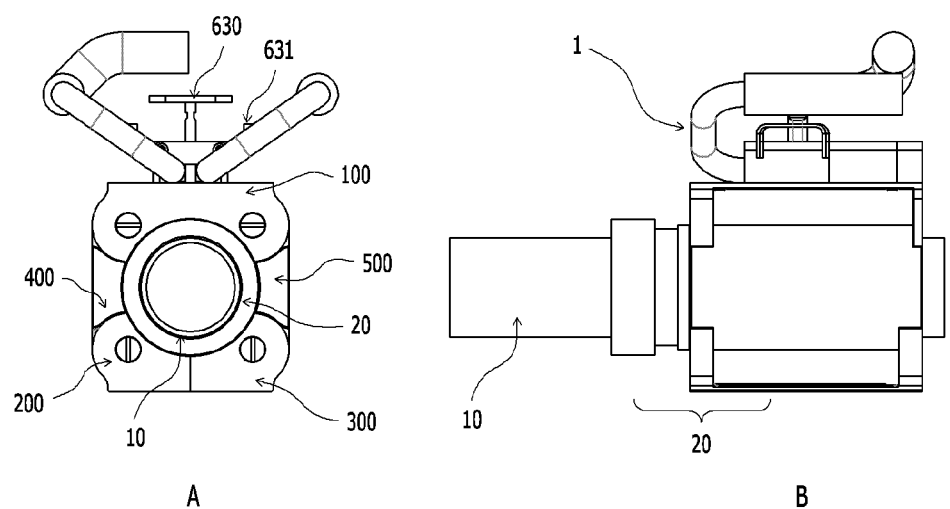
FIG. 7C is a schematic front view and a right side view illustrating the swaging-type tube fitting fastening tool according to the exemplary embodiment of the present application in the grasping completion state.

FIG. 7A is a schematic front view and a right side view illustrating a swaging-type tube fitting fastening tool according to the exemplary embodiment of the present application in the grasping preparation state, FIG. 7B is a schematic front view and a right side view illustrating the swaging-type tube fitting fastening tool according to the exemplary embodiment of the present application in the intermediate grasping state, and FIG. 7C is a schematic front view and a right side view illustrating the swaging-type tube fitting fastening tool according to the exemplary embodiment of the present application in the grasping completion state.

Figure 8A:
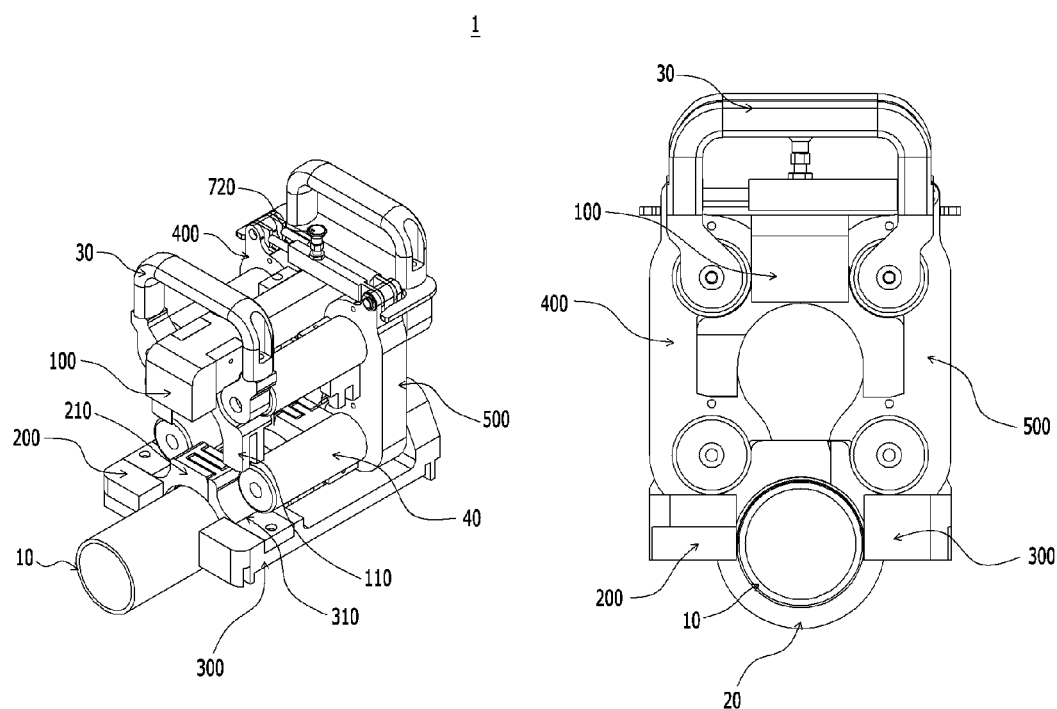
FIG. 8A is a schematic perspective view and a front view illustrating a swaging-type tube fitting fastening tool according to another exemplary embodiment of the present application in the grasping preparation state.
Figure 8B:
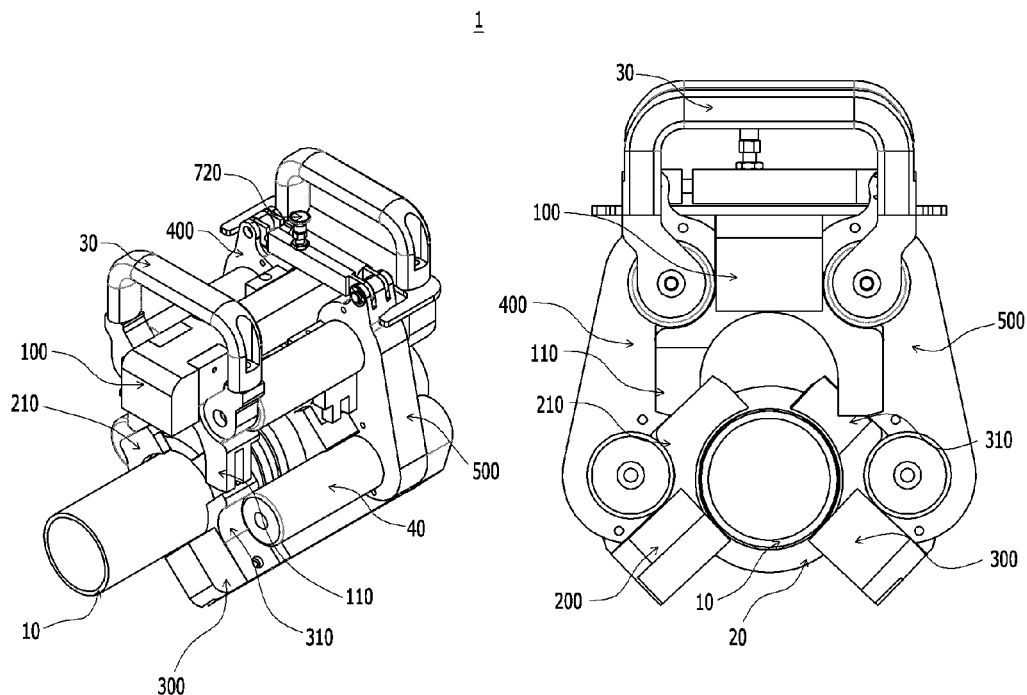
FIG. 8B is a schematic perspective view and a front view illustrating the swaging-type tube fitting fastening tool according to another exemplary embodiment of the present application in the intermediate grasping state.
Figure 8C:
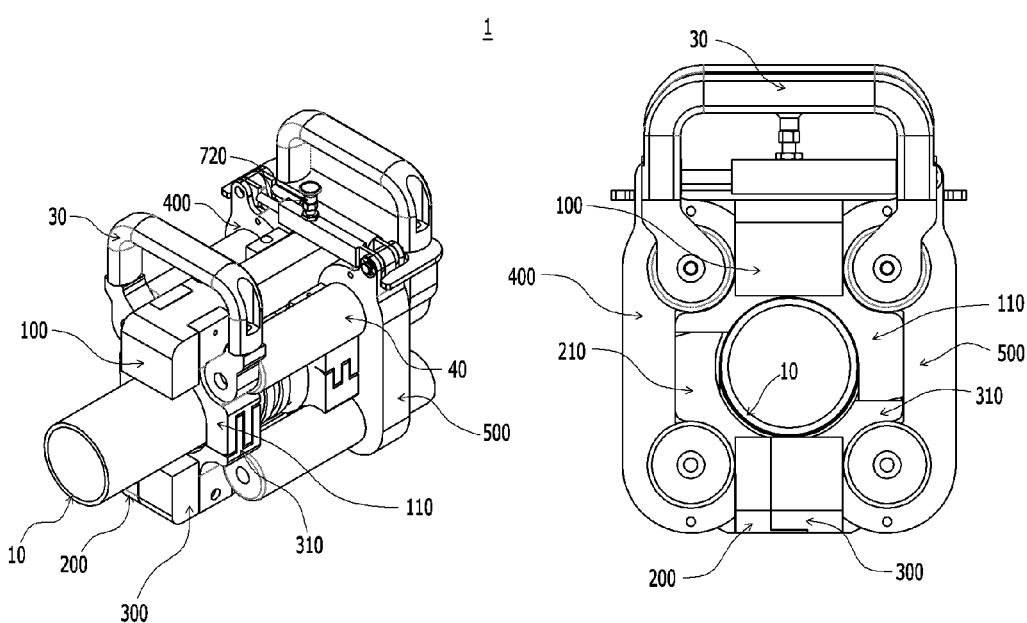
FIG. 8C is a schematic perspective view and a front view illustrating the swaging-type tube fitting fastening tool according to another exemplary embodiment of the present application in the grasping completion state.

FIG. 8A is a schematic perspective view and a front view illustrating a swaging-type tube fitting fastening tool according to another exemplary embodiment of the present application in the grasping preparation state, FIG. 8B is a schematic perspective view and a front view illustrating the swaging-type tube fitting fastening tool according to another exemplary embodiment of the present application in the intermediate grasping state, and FIG. 8C is a schematic perspective view and a front view illustrating the swaging-type tube fitting fastening tool according to another exemplary embodiment of the present application in the grasping completion state.

Referring to FIGS. 7A to 8C, the swaging-type tube fitting fastening tool 1 (hereinafter, referred to as a 'tube fitting fastening tool 1') may include the above-described object grasping device 1000 configured to grasp a first object, a neighboring object grasping device disposed adjacent to the object grasping device 1000 and configured to grasp a second object, and a fastening force providing device 40 configured to adjust a spacing distance between the object grasping device 1000 and the neighboring object grasping device.

As another example, the tube fitting fastening tool 1 may include the object grasping device 1000, the fastening force providing device 40, and the neighboring object grasping device disposed adjacent to the object grasping device 1000 and configured to grasp the second object.

In addition, referring to FIGS. 7A to 8C, the swaging-type tube fitting fastening tool 1 may include a handle unit 30 that allows the user to grasp and manipulate the tool.

In other words, the tube fitting fastening tool 1 may include the single object grasping device 1000 and the fastening force providing device 40. As another example, the tube fitting fastening tool 1 may include the pair of object grasping devices (the object grasping device 1000 configured to grasp the first object and the neighboring object grasping device configured to grasp the second object) and the fastening force providing device 40.

For example, the fastening force providing device 40 may include a hydraulic cylinder. In addition, the fastening force providing device 40 may include a route member configured to provide a route along which the object grasping device 1000 moves in response to linear driving power from the hydraulic cylinder. For example, the route member may be provided in the form of a rail.

Hereinafter, an operational principle of the tube fitting fastening tool 1 will be described with reference to FIGS. 9A and 9B.

Figure 9A:
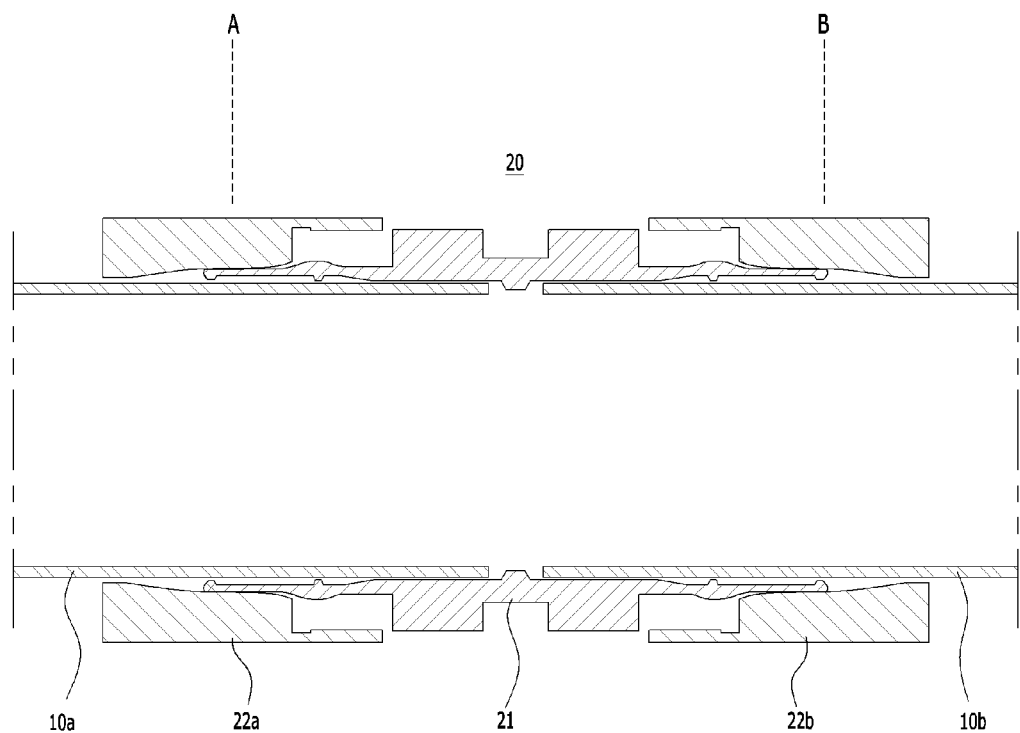
FIGS. 9A and 9B are cross-sectional views schematically illustrating states before and after an object is swaged by the swaging-type tube fitting fastening tool.
Figure 9B:
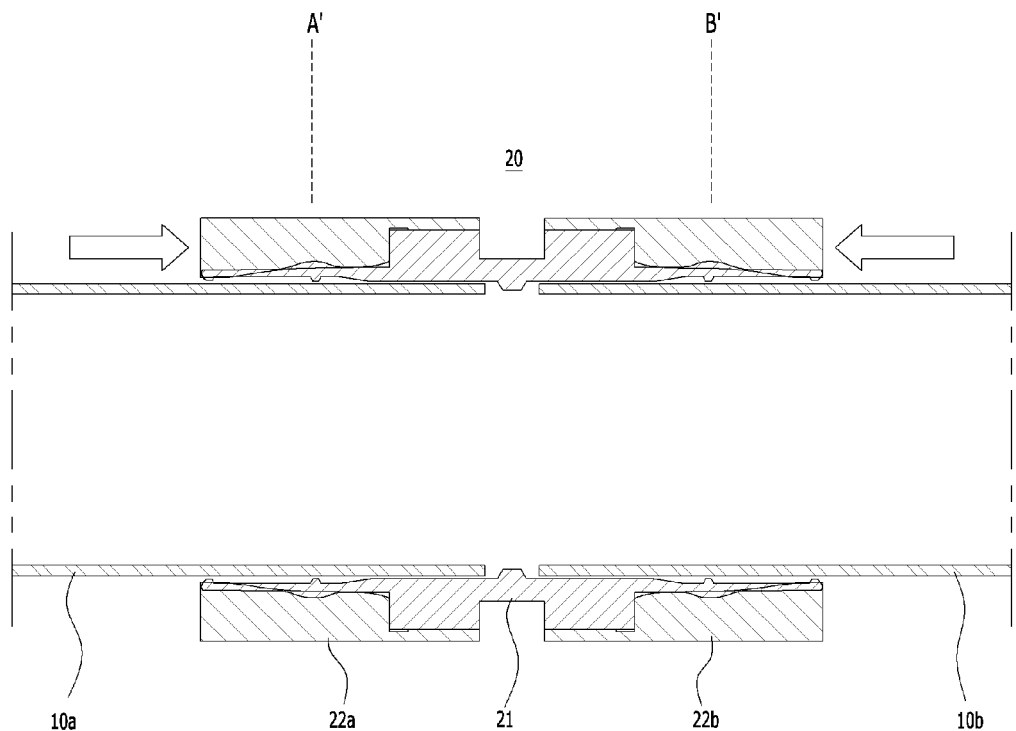

FIGS. 9A and 9B are cross-sectional views schematically illustrating states before and after the object is swaged by the swaging-type tube fitting fastening tool.

Referring to FIGS. 9A and 9B, the ends of the two tubes 10*a* and 10*b* may be inserted into the tube fitting 20. In this case, the tube fitting 20 may include a body 21 having a cylindrical shape configured to surround a predetermined region from the ends of the tubes 10*a* and 10*b*, and a pair of swage rings 22*a* and 22*b* configured to decrease an outer diameter of the body 21 while linearly moving toward a central portion of the body 21. In addition, the tube fitting 20 may be referred to as a fitting, as another example, in accordance with the exemplary embodiments.

When the swage rings 22*a* and 22*b* move toward the central portion of the body 21, the outer diameter of the body 21 is decreased by the swage rings 22*a* and 22*b*, and a gap between an inner surface of the body 21 and outer surfaces of the tubes 10*a* and 10*b* is removed, such that a fluid passing through interiors of the tubes 10*a* and 10*b* may be prevented from leaking and the tubes 10*a* and 10*b* may be strongly fixed to the body 21. The swaging-type coupling may ensure high reliability and coupling force in comparison with other mechanical connection methods, simplify the construction in comparison with welding/fusion methods, and facilitate quality control.

The tube fitting fastening tool 1 may grasp the object in a state before the swage rings 22*a* and 22*b* move linearly (i.e., in a state before swaging as illustrated in FIG. 9A). According to the exemplary embodiment of the present application, the object to be grasped by the tube fitting fastening tool 1 may be, but not limited only to, the swage rings 22*a* and 22*b*. As another example, the swaging-type tube fitting fastening tool 1 may grasp the tubes 10*a* and 10*b*. Referring to FIG. 9A, A may be an approximately position at which the object grasping device 1000 grasps the first object, and B may be an approximately position at which the neighboring object grasping device grasps the second object.

In the case of the tube fitting fastening tool 1 including the pair of object grasping devices 1000, both the two swage rings 22*a* and 22*b* may be grasped by one tube fitting fastening tool 1. As another example, in the case of the tube fitting fastening tool 1 including the single object grasping device 1000, one swage ring 22*a* may be grasped by the tube fitting fastening tool 1, and the other swage ring 22*b* may be grasped by a separate neighboring object grasping device.

In particular, in the case in which the object is grasped by the tube fitting fastening tool 1 including the single object grasping device 1000 and by the separate neighboring object grasping device, the tube fitting fastening tool 1 and the neighboring object grasping device may grasp the object independently, such that it is possible to independently grasp the swage rings 22*a* and 22*b* of the tube fitting 20, even though the tube fitting 20 has a complicated shape, such as a curved tube or a T-shaped tube, in order to connect the tubes extending in different directions.

When the first object and the second object are grasped by the tube fitting fastening tool 1 (e.g., when the two swage rings 22*a* and 22*b* are grasped), the fastening force for decreasing the spacing distance between the object grasping device 1000 and the neighboring object grasping device is provided by the fastening force providing device 40, such that the object grasping device 1000 and the neighboring object grasping device move to be adjacent to each other, and the swage rings 22*a* and 22*b* linear move toward the central portion of the body 21. As a result, the outer diameter of the body 21 is decreased, and the gap between the inner surface of the body 21 and the outer surfaces of the tubes 10*a* and 10*b* is removed, such that the fluid passing through the interiors of the tubes 10*a* and 10*b* may be prevented from leaking, and the tubes 10*a* and 10*b* may be strongly fixed to the body 21.

In the case of the tube fitting fastening tool 1 including the pair of object grasping devices 1000, the fastening force providing device 40 may be implemented to provide fastening force to both the pair of object grasping devices 1000 so that the pair of object grasping devices 1000 may move to be adjacent to each other. That is, referring to FIGS. 9A and 9B, the fastening force providing device 40 may provide fastening force so that the pair of object grasping devices 1000 moves in the ways of A→A' position and B→B' position, respectively.

As another example, in the case of the tube fitting fastening tool 1 including the single object grasping device 1000, the fastening force providing device may be implemented to provide fastening force to the single object grasping device 1000 so that in the state in which the second object is grasped (fixed) by the neighboring object grasping device, the single object grasping device 1000 moves to be adjacent to the neighboring object grasping device that maintains the state of grasping (fixing) the second object. That is, the fastening force providing device 40 may provide fastening force so that the object grasping device 1000 configured to grasp the first object moves in the way of A→A' position so as to be adjacent to the neighboring object grasping device in the state in which the neighboring object grasping device maintains the grasped (fixed) position (B=B').

As described above, the tube fitting fastening tool 1 may be applied to various tube swaging structures. In addition, the tube fitting fastening tool 1 may of course be applied to tube connecting devices (tube fittings) filed by the present applicant and disclosed in Korean Patent Nos. 10-1843159, 10-1854831, 10-1792571, 10-1937860, 10-1937862, 10-1967642, 10-1967636, and the like.

The description of the object grasping device 1000 for grasping the outer peripheral surface of the object and the swaging-type tube fitting fastening tool 1 using the same may be understood by the exemplary embodiments of the present application and the description of the swaging-type tube fitting fastening tool to be described below. Therefore, hereinafter, the description of the object grasping device 1000 for grasping the outer peripheral surface of the object and the swaging-type tube fitting fastening tool 1 using the same may be equally applied to the following swaging-type tube fitting fastening tool even if the description is omitted.

Figure 10:
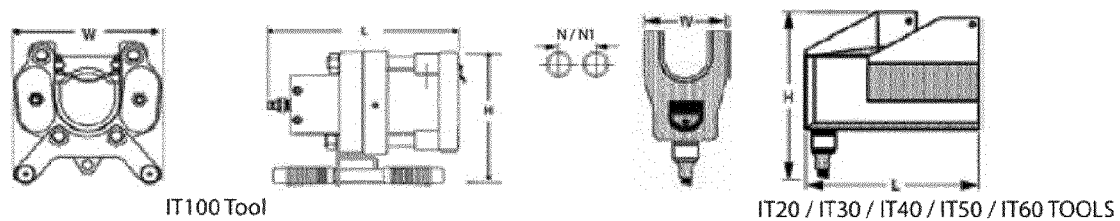
FIG. 10 is a view illustrating a U-shaped tool in the related art.
Figure 11:
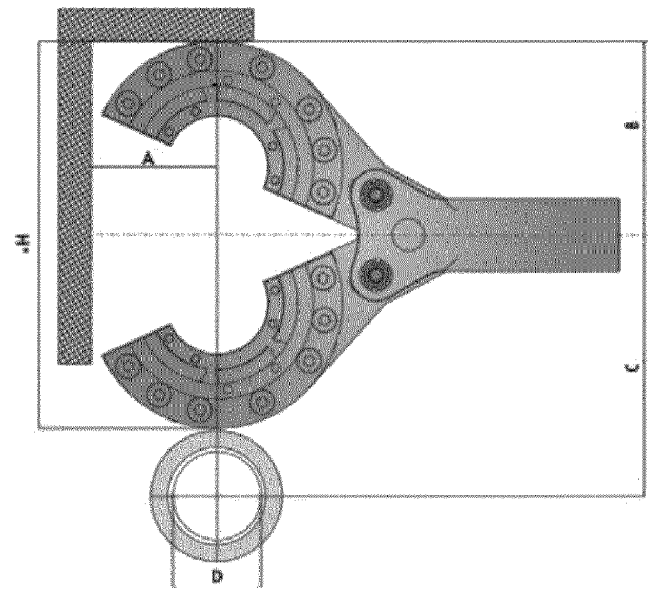
FIG. 11 is a view illustrating an O-shaped tool in the related art.
Figure 12:
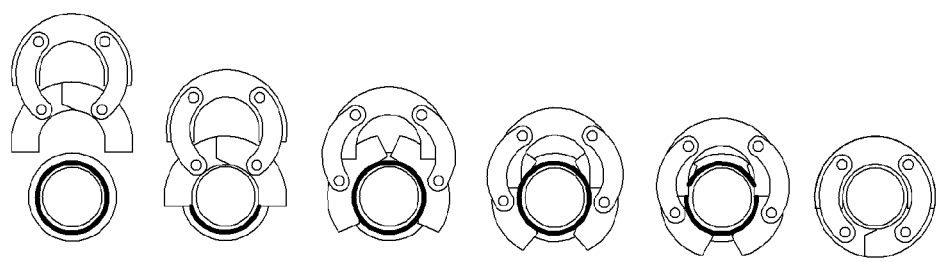
FIG. 12 is a view for explaining a process of mounting the swaging-type tube fitting fastening tool according to another exemplary embodiment of the present application.
Figure 13:
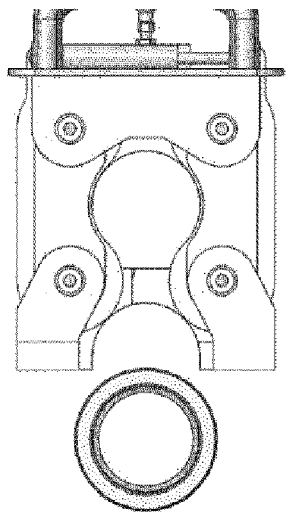
FIGS. 13 to 19 are views illustrating the process of mounting the swaging-type tube fitting fastening tool according to another exemplary embodiment of the present application which is organized in a time series manner.
Figure 13:
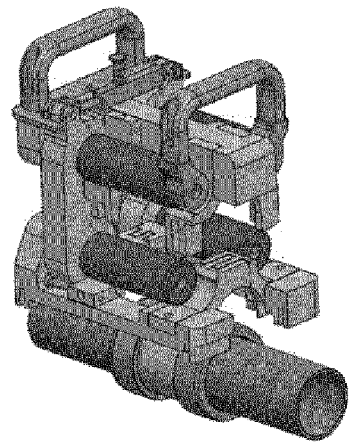
Figure 14:
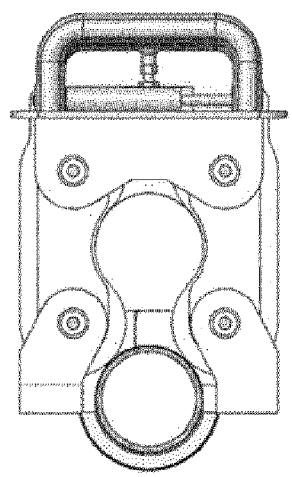
Figure 14:
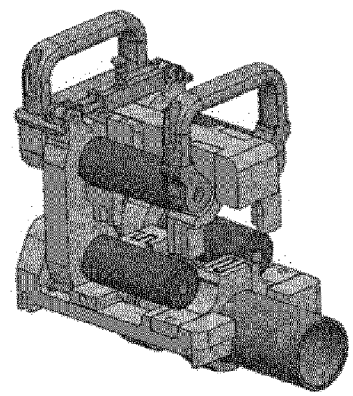
Figure 15:
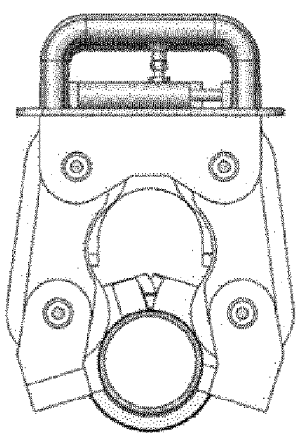
Figure 15:
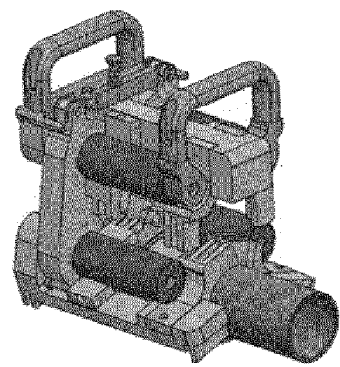
Figure 16:
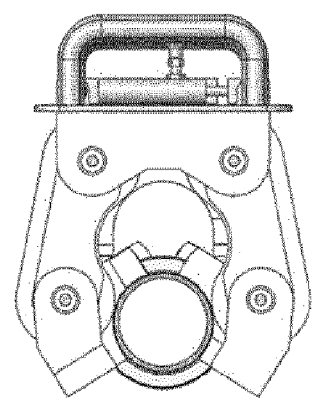
Figure 16:
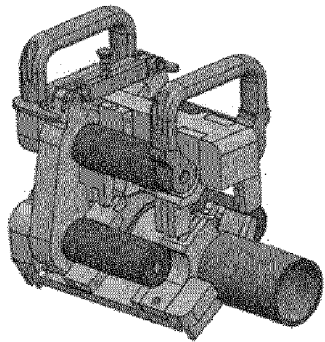
Figure 17:
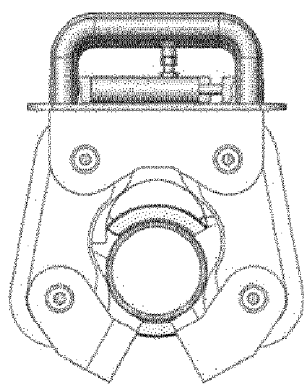
Figure 17:
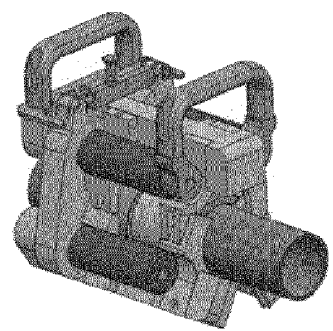
Figure 18:
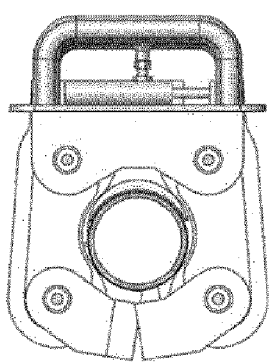
Figure 18:
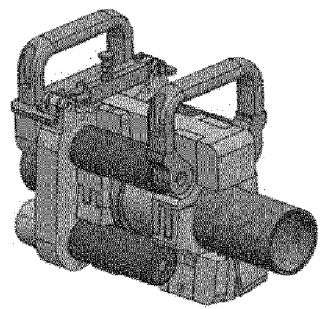
Figure 19:
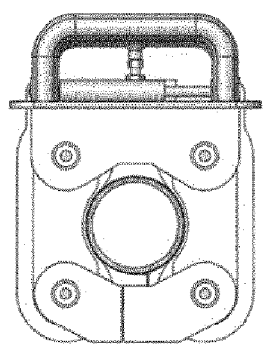
Figure 19:
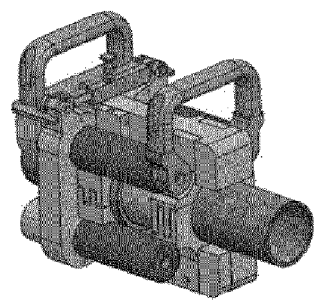
Figure 20:
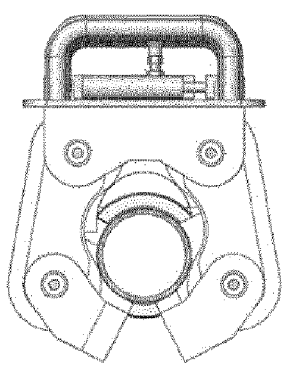
FIGS. 20 and 21 are views illustrating the process of mounting the swaging-type tube fitting fastening tool according to another exemplary embodiment of the present application when viewed from the rear side and illustrating a state in which a ] frame and an insert engage and interlock with each other.
Figure 20:
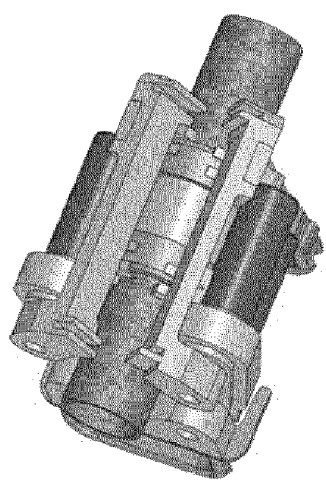
Figure 21:
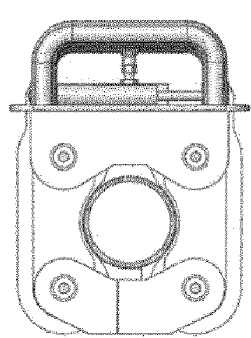
Figure 21:
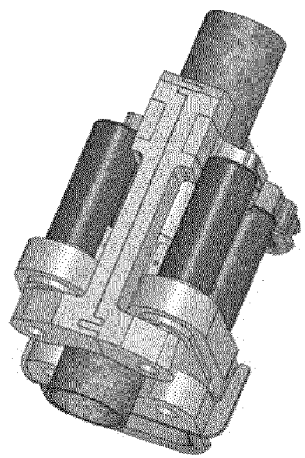
Figure 22:
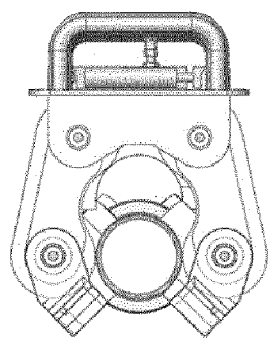
FIGS. 22 to 25 are views schematically illustrating states in which the ] frame is illustrated in a semi-transparent shape so that the shape of the insert of the swaging-type tube fitting fastening tool according to another exemplary embodiment of the present application can be seen better.
Figure 22:
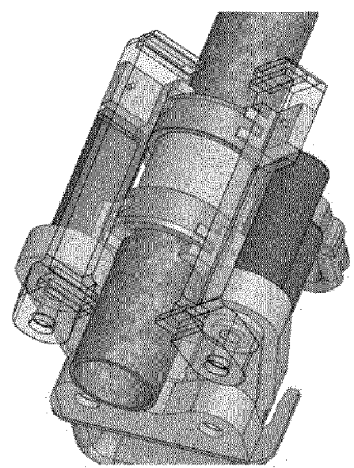
Figure 23:
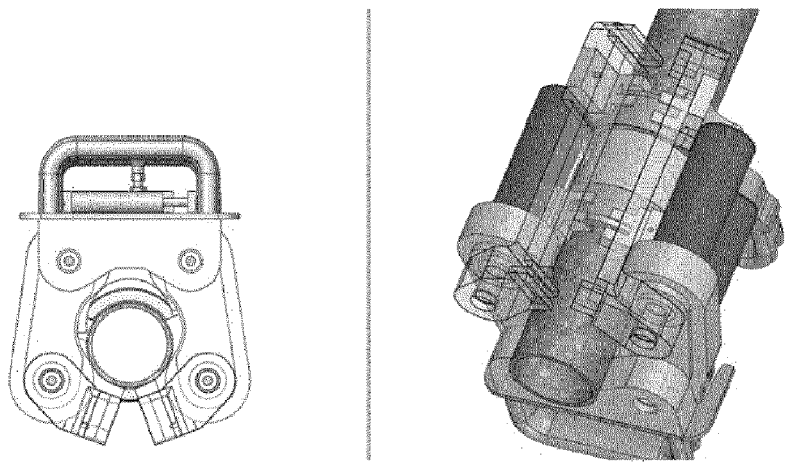
Figure 24:
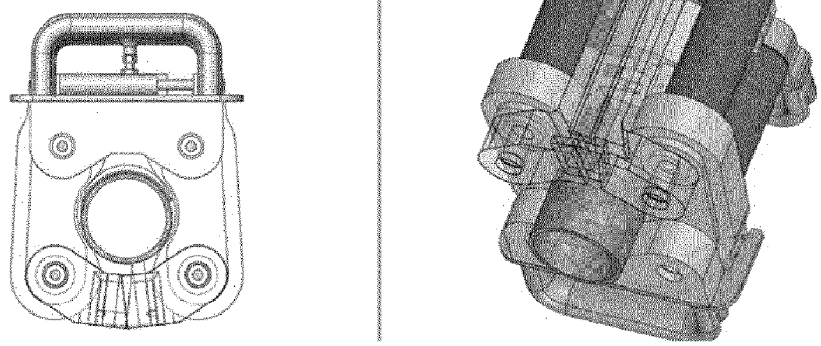
Figure 25:
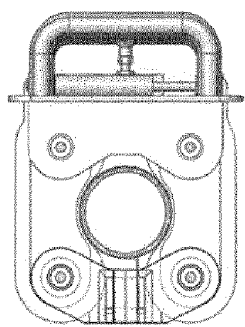
Figure 25:
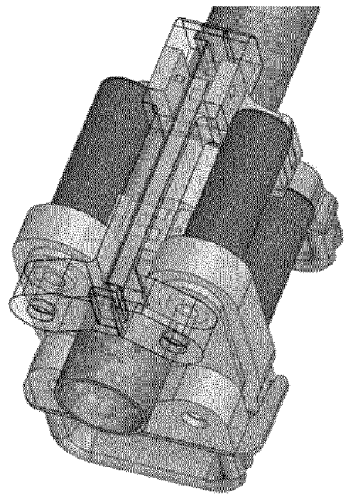

Most tools used to fasten a swaging-type tube fitting that moves a swage ring in a longitudinal direction of a tube to a position above an outer body adopt a hydraulic driving method that may generate high force with a device having a small size and a small weight. Depending on the forms of the tools, the tools may be broadly classified into a tool (hereinafter, referred to as an 'O-shaped tool') configured to surround both the swage ring and an outer portion of the outer body, and a tool (hereinafter, referred to as a 'U-shaped tool') having a U shape, opened at one side thereof, and configured to be inserted by being pushed laterally. For reference, FIG. 10 is a view illustrating the U-shaped tool in the related art, and FIG. 11 is a view illustrating the O-shaped tool in the related art.

An object of the present application is to derive a new shape of a fastening tool having convenience of manipulation and ease of operation in a narrow area, which are advantages of the U-shaped tool, and having safety, which is an advantage of the O-shaped tool.

The swaging-type tube fitting fastening tool according to the exemplary embodiment of the present application may include a plurality of hydraulic cylinders, a frame configured to connect the plurality of hydraulic cylinders structurally and functionally, and an insert mounted to be replaceable in accordance with a size of the tube fitting to be fastened.

Configuration and Advantage of Hydraulic Cylinder and Frame

In the related, the one or more hydraulic cylinders are used in parallel with the axis of the tube. The frame may transmit force, through the insert, to components constituting the tube fitting when the hydraulic cylinders operate to push or pull the tool so that the components constituting the tube fitting move in the longitudinal direction relative to the tube. The structure and the arrangement of the hydraulic cylinder and the frame determine characteristics of the tool.

In the U-shaped tool in the related art, the single cylinder is disposed at the position opposite to the opening side or the plurality of cylinders is disposed symmetrically at the left and right sides of the U-shaped frame. Because the U-shaped tool has a structure that may be immediately inserted into the tube fitting without an operation of opening and closing the tool through the opening side, there is an advantage in that the tool may be conveniently manipulated. In addition, the U-shaped tool is advantageous in directly machining the frame to form a passageway for hydraulic oil supplied to the cylinder, thereby simplifying the configuration.

However, the U-shaped tool may transmit force only to a partial region of the tube fitting due to the opened structure. Because the cylinder cannot be disposed on the opening side and thus the cylinder having a relatively large size is disposed at the position distant from the tube fitting, there is a drawback in that the frame needs to be relatively large and heavy in weight in order to ensure mechanical rigidity. In addition, if the tube fitting is partially separated during a fastening process, there is a risk that the fastening process may be incompletely performed or the tool may be damaged.

The O-shaped tool is configured such that the plurality of cylinders is disposed along the circumference that surrounds the tube. Unlike the U-shaped tool, the O-shaped tool operates such that one side of the O-shaped tool is opened in the form of an open mouth and then closed again while surrounding the tube fitting, and as a result, the O-shaped tool uses two or more separated frames.

The O-shaped tool may transmit a balanced force along the circumference of the tube fitting, such that the O-shaped tool is structurally stable and also advantageous in miniaturization/lightweight of the frame. The O-shaped tool advantageously prevents the separation of the tube fitting during the fastening process.

However, in comparison with the U-shaped tool, the O-shaped tool requires a wider space in the step of opening the tool and placing the tube fitting in the tool, and as a result, there is a drawback in that usability deteriorates in a narrow workspace.

The swaging-type tube fitting fastening tool according to the exemplary embodiment of the present application includes the U frame having a similar structure to the U-shaped tool in the related art, and the two ] frames configured to rotate about the tube fitting and coupled to the U frame to define an O-shaped structure. The plurality of hydraulic cylinders is disposed along the circumference of the tool. The U frame and the ] frame are connected with the link. Some of the hydraulic cylinders may be configured concentrically with the rotating axis of the link.

The ] frames are coupled to each other in a mounting preparation state and disposed so that one side thereof is opened like the U frame. A state in which the U frames are positioned behind the ] frames and the opening side, like ⊂ ⊂ ⊙, faces the tube fitting and the tube is the mounting preparation state. When the tool is moved to place the tube fitting in the U shape formed by the ] frames and then the tool is further moved in the same direction, the force, which is applied to the surface of the ] frame being is in contact with the tube fitting and the tube or the surface of the insert connected to the ] frame, allows the ] frame to rotate. In this case, the ] frame or the insert connected to the ] frame remains in contact with the tube fitting and the tube and moves while rotating about the tube fitting and the tube. When the rotation is completed, the U shape, which is initially formed on a side opposite to the first contact portion, is inverted and coupled to the ] frames again to form '⊂ ⊙ ⊃', and then combined with the U frame that approaches the tube fitting, thereby forming the single O-shaped frame structure. In this case, restoring force, which is directed toward the center of the tool, is applied to the link for connecting the U frame and the ] frame so that the motion is naturally induced. When the fastening tool is pulled by applying force in a direction opposite to the direction of the mounting step, the state is returned back to the mounting preparation state due to the link and the frame structure having the restoring force without a separate manipulation.

According to the swaging-type tube fitting fastening tool according to the exemplary embodiment of the present application, the preparation to mount and fasten the tool is completed, by means of the structural feature, with a simple operation of pushing the tool rectilinearly from one side, like the U-shaped tool in the related art, and as a result, an operation of separately opening the tool is not required. Further, like the O-shaped tool, the entire tube is surrounded by the tool, and as a result, it is possible to ensure safety and implement a relatively lightweight and small configuration. In addition, it is not necessary to open the tool in order to ensure an angle that allows the insertion of the tube fitting, and as a result, there is an advantage in that the tool may be mounted even in a narrower space in comparison with the O-shaped tool in the related art.

2. Configuration and Advantage of Insert

In the related art, the inserts are mounted at an end and a central portion of the tube fitting or an end and an opposite end of the tube fitting, such that the two U-shaped inserts are used for the U-shaped tool and the two pairs of inserts (a total of four inserts), which are symmetrical with respect to the central axis of the tube, are used for the O-shaped tool. The insert serves to fill a space between the frame of the fastening tool and the tube fitting and transmit the force. Therefore, it is possible to cope with the tube fittings having various sizes with the single fastening tool.

The present application adopts the structure which is deformed from the U shape to the O shape, and the insert is also configured to be deformed from the U shape to the O shape.

The insert of the O-shaped fastening tool in the related art has a shape cut into the C shape in accordance with the shape of the opened tool. The inserts do not interact with one another during the process of opening and closing the tool.

In contrast, according to the inserts of the present application, the inserts engage with one another in the form of interlocked fingers when the ] frame is rotated and the structure is changed to the O-shaped structure. With the connection structure, it is possible to distribute moment of force which is generated when the fastening tool applies force for swaging, such that stress is not concentrated only on the frame, unlike the tool in the related art. As a result, there is an effect of exhibiting fastening force even with the frame having relatively low rigidity. Therefore, there is an advantage of reducing an overall size and an overall weight of the fastening tool. This structure may be applied not only to the insert, but also to the portion where the ] frame and the U frame are in contact with each other in order to obtain a greater effect.

It will be appreciated that the exemplary embodiments of the present application have been described above for purposes of illustration, and those skilled in the art may understand that the present application may be easily modified in other specific forms without changing the technical spirit or the essential features of the present application. Therefore, it should be understood that the above-described exemplary embodiments are illustrative in all aspects and do not limit the present application. For example, each component described as a single type may be carried out in a distributed manner. Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

The invention claimed is:

1. An object grasping device configured to grasp an outer peripheral surface of an object, the object grasping device comprising:
    an upper frame provided to have an inner peripheral surface shape corresponding to an outer peripheral surface of an upper portion of the object so as to surround the outer peripheral surface of the upper portion of the object in a grasping completion state in which the object grasping device grasps the outer peripheral surface of the object;
    a left lower frame provided to have an inner peripheral surface shape corresponding to an outer peripheral surface of a left lower portion of the object so as to surround the outer peripheral surface of the left lower portion of the object in the grasping completion state;
    a right lower frame provided to have an inner peripheral surface shape corresponding to an outer peripheral surface of a right lower portion of the object so as to surround the outer peripheral surface of the right lower portion of the object in the grasping completion state;
    a left link member configured to link a left portion of the upper frame and a middle portion of the left lower frame by means of hinges each having a rotating axis defined in a forward/backward direction; and
    a right link member configured to link a right portion of the upper frame and a middle portion of the right lower frame by means of hinges each having a rotating axis defined in the forward/backward direction,
    wherein a grasping preparation state before the object is introduced between the left link member and the right link member is a state in which the left lower frame surrounds the outer peripheral surface of the left upper portion of the object and the right lower frame surrounds the outer peripheral surface of the right upper portion of the object,
    wherein the grasping completion state is a state in which the left lower frame is rotated counterclockwise based on the grasping preparation state and surrounds the outer peripheral surface of the left lower portion of the object and the right lower frame is rotated clockwise based on the grasping preparation state and surrounds the outer peripheral surface of the right lower portion of the object,
    wherein the left link member and the right link member are provided so that an interval between the left lower frame and the right lower frame forms a spacing gap through which the object passes in an intermediate grasping state in which the grasping preparation state is switched to the grasping completion state,
    wherein when a pushing pressure is applied to the object grasping device in the grasping preparation state, the left lower frame and the right lower frame rotate and reach the grasping completion state via the intermediate grasping state in which the spacing gap is formed, and
    wherein the left link member and the right link member provide a restoring force to convert to the grasping completion state, when the pushing pressure by the object is applied to the left lower frame and the right lower frame in the grasping preparation state.

2. The object grasping device of claim 1, wherein the upper frame comprises:
    an upper body; and
    an upper insert having an inner peripheral surface shape corresponding to the outer peripheral surface of the upper portion of the object and detachably fixed to the upper body,
    wherein the left lower frame comprises:
    a left lower body; and
    a left lower insert having an inner peripheral surface shape corresponding to the outer peripheral surface of the left lower portion of the object and detachably fixed to the left lower body, and
    wherein the right lower frame comprises:
    a right lower body; and
    a right lower insert having an inner peripheral surface shape corresponding to the outer peripheral surface of the right lower portion of the object and detachably fixed to the right lower body.

3. The object grasping device of claim 2, wherein one or more of the upper insert, the left lower insert, and the right lower insert have an open hole opened at one side thereof and having an inner width larger than an opening width, and
    wherein a fastening member, which has a first width larger than the opening width and equal to or smaller than the inner width and has a second width which is equal to or smaller than the opening width and is a width in a direction orthogonal to a direction of the first width, is inserted into the open hole and rotated, such that one or more of the upper insert, the left lower insert, and the right lower insert are detachably fixed.

4. The object grasping device of claim 2, wherein in the grasping completion state, an end of the left lower insert and an end of the right lower insert, which face each other, are provided to engage with each other in the form of an interlock structure, and
    wherein the interlock structure is provided in a form that restricts individual movements in the forward/backward direction and permits a switch from the grasping preparation state to the grasping completion state.

5. The object grasping device of claim 4, wherein in the grasping completion state, an end of the upper insert and the end of the left lower insert, which face each other, are provided to engage with each other in the form of the interlock structure, and the end of the upper insert and the end of the right lower insert, which face each other, are provided to engage with each other in the form of the interlock structure.

6. The object grasping device of claim 1, further comprising:
a link angle restriction unit provided to restrict a rotation angle of the left link member and a rotation angle of the right link member within a predetermined angle range.

7. The object grasping device of claim 6, wherein the link angle restriction unit comprises:
a left slot member protruding and extending from the left link member toward the right link member and having a left slot;
a right slot member protruding and extending from the right link member toward the left link member so as to partially intersect the left slot member and having a right slot formed to overlap the left slot in the forward/backward direction;
a restriction member having a link angle restriction hole formed to overlap the portion where the left slot and the right slot overlap each other;
a restriction body connected to the upper frame such that the restriction member is mounted on the restriction body so as to be movable between the left link member and the right link member in an upward/downward direction; and
a restriction pin fastened to traverse, in the forward/backward direction, an overlap region in which all the left slot, the right slot, and the link angle restriction hole overlap one another.

8. The object grasping device of claim 7, wherein a catching groove is formed in an outer surface of the restriction member, and
wherein the link angle restriction unit further comprises:
a catching unit provided to be caught by the catching groove or released from the catching groove in the grasping completion state; and
a locking mechanism configured to selectively provide any one of a locking holding mode that prevents the catching unit from being separated from the catching groove in the grasping completion state and a locking releasing mode that permits the separation of the catching unit from the catching groove in the grasping completion state.

9. The object grasping device of claim 8, wherein the link angle restriction unit further comprises:
an elastic unit configured to elastically press the catching unit toward the catching groove so that the catching unit is caught by the catching groove, and
wherein automatic locking is performed by the elastic unit in the grasping completion state.

10. The object grasping device of claim 8, wherein one or both of an inner upper surface and an inner lower surface of the catching groove are formed as an inclined surface so that the separation of the catching unit is guided when the restriction member moves in the upward/downward direction in the locking releasing mode.

11. The object grasping device of claim 8, wherein the locking mechanism is provided to have an available space formed outside the catching groove so as to be equal to or larger than a width of the catching unit in the locking releasing mode, and have an available space formed outside the catching groove so as to be smaller than the width of the catching unit in the locking holding mode.

12. The object grasping device of claim 11, wherein the restriction body has a receiving space in which the catching unit is disposed,
wherein the restriction member is disposed to be movable in the upward/downward direction through a through hole formed in the receiving space, and
wherein the locking mechanism is placed in any one of the locking releasing mode and the locking holding mode by being moved in the upward/downward direction.

13. The object grasping device of claim 1, wherein the hinge connection between the left link member and the middle portion of the left lower frame is implemented by a snap structure comprising a cam part and a cam follower.

14. A swaging-type tube fitting fastening tool comprising:
an object grasping device according to claim 1 configured to grasp a first object; and
a fastening force providing device configured to adjust a spacing distance between the object grasping device and a neighboring object grasping device disposed adjacent to the object grasping device and configured to grasp a second object.

15. An object grasping device configured to grasp an outer peripheral surface of an object, the object grasping device comprising:
an upper frame provided to have an inner peripheral surface shape corresponding to an outer peripheral surface of an upper portion of the object so as to surround the outer peripheral surface of the upper portion of the object in a grasping completion state in which the object grasping device grasps the outer peripheral surface of the object;
a left lower frame provided to have an inner peripheral surface shape corresponding to an outer peripheral surface of a left lower portion of the object so as to surround the outer peripheral surface of the left lower portion of the object in the grasping completion state;
a right lower frame provided to have an inner peripheral surface shape corresponding to an outer peripheral surface of a right lower portion of the object so as to surround the outer peripheral surface of the right lower portion of the object in the grasping completion state;
a left link member configured to link a left portion of the upper frame and a middle portion of the left lower frame by means of hinges each having a rotating axis defined in a forward/backward direction;
a right link member configured to link a right portion of the upper frame and a middle portion of the right lower frame by means of hinges each having a rotating axis defined in the forward/backward direction; and
a link angle restriction unit provided to restrict a rotation angle of the left link member and a rotation angle of the right link member within a predetermined angle range,
wherein the link angle restriction unit comprises:
a left slot member protruding and extending from the left link member toward the right link member and having a left slot;
a right slot member protruding and extending from the right link member toward the left link member so as to partially intersect the left slot member and having a right slot formed to overlap the left slot in the forward/backward direction;
a restriction member having a link angle restriction hole formed to overlap the portion where the left slot and the right slot overlap each other;

a restriction body connected to the upper frame such that the restriction member is mounted on the restriction body so as to be movable between the left link member and the right link member in an upward/downward direction; and a restriction pin fastened to traverse, in the forward/backward direction, an overlap region in which all the left slot, the right slot, and the link angle restriction hole overlap one another.

16. The object grasping device of claim 15, wherein a catching groove is formed in an outer surface of the restriction member, and wherein the link angle restriction unit further comprises:

a catching unit provided to be caught by the catching groove or released from the catching groove in the grasping completion state; and a locking mechanism configured to selectively provide any one of a locking holding mode that prevents the catching unit from being separated from the catching groove in the grasping completion state and a locking releasing mode that permits the separation of the catching unit from the catching groove in the grasping completion state.

17. The object grasping device of claim 16, wherein the link angle restriction unit further comprises:

an elastic unit configured to elastically press the catching unit toward the catching groove so that the catching unit is caught by the catching groove, and wherein automatic locking is performed by the elastic unit in the grasping completion state.

18. The object grasping device of claim 16, wherein one or both of an inner upper surface and an inner lower surface of the catching groove are formed as an inclined surface so that the separation of the catching unit is guided when the restriction member moves in the upward/downward direction in the locking releasing mode.

19. The object grasping device of claim 16, wherein the locking mechanism is provided to have an available space formed outside the catching groove so as to be equal to or larger than a width of the catching unit in the locking releasing mode, and have an available space formed outside the catching groove so as to be smaller than the width of the catching unit in the locking holding mode.

20. The object grasping device of claim 19, wherein the restriction body has a receiving space in which the catching unit is disposed, wherein the restriction member is disposed to be movable in the upward/downward direction through a through hole formed in the receiving space, and wherein the locking mechanism is placed in any one of the locking releasing mode and the locking holding mode by being moved in the upward/downward direction.

* * * * *